United States Patent [19]

Carus et al.

[11] Patent Number: 5,680,628
[45] Date of Patent: Oct. 21, 1997

[54] METHOD AND APPARATUS FOR AUTOMATED SEARCH AND RETRIEVAL PROCESS

[75] Inventors: Alwin B. Carus, Newton; Michael Wiesner, West Roxbury; Ateeque R. Haque, Medford, all of Mass.

[73] Assignee: Inso Corporation, Boston, Mass.

[21] Appl. No.: 503,981

[22] Filed: Jul. 19, 1995

[51] Int. Cl.⁶ .................................................. G06F 17/28
[52] U.S. Cl. .................................................. 395/759
[58] Field of Search ................................. 395/754, 759

[56] References Cited

U.S. PATENT DOCUMENTS

| | | | |
|---|---|---|---|
| 4,724,523 | 2/1988 | Kucera | 364/419 |
| 4,730,270 | 3/1988 | Okajima et al. | 364/900 |
| 4,771,401 | 9/1988 | Kaufman et al. | 364/900 |
| 4,862,408 | 8/1989 | Zamora | 364/900 |
| 4,864,501 | 9/1989 | Kucera . | |
| 4,864,502 | 9/1989 | Kucera et al. | 364/419 |
| 4,914,590 | 4/1990 | Loatman et al. | 364/419 |
| 4,964,044 | 10/1990 | Kumano et al. | 374/419 |
| 5,229,936 | 7/1993 | Decker et al. | 364/419 |
| 5,251,129 | 10/1993 | Jacobs et al. | 364/419.08 |
| 5,282,265 | 1/1994 | Rohra Suda et al. | 395/12 |
| 5,331,556 | 7/1994 | Black, Jr. et al. | 364/419.08 |
| 5,383,120 | 1/1995 | Zernik . | |

FOREIGN PATENT DOCUMENTS

| | | |
|---|---|---|
| 0282721A3 | 9/1988 | European Pat. Off. . |
| 0316743A3 | 5/1989 | European Pat. Off. . |
| 0327266A2 | 8/1989 | European Pat. Off. . |
| 0394633A2 | 10/1990 | European Pat. Off. . |
| 0 583 083 A2 | 7/1993 | European Pat. Off. . |
| 0562334A2 | 9/1993 | European Pat. Off. . |

OTHER PUBLICATIONS

Brill, Eric, "A Simple Rule–Based Part of Speech Tagger", *Third Conf. Applied Natural Lang. Processing, Proceedings of the Conference* (1992).
Schwartz, C., "Automatic Syntactic Analysis of Free Text", *J. Am. Soc. Info. Sci.* 41(6):408–417 (1990).
International Search Report mailed: Oct. 15, 1996.

*Primary Examiner*—Donald E. McElheny, Jr.
*Attorney, Agent, or Firm*—Lahive & Cockfield, LLP

[57] ABSTRACT

An apparatus and method for the identification of noun phrases in a stream of natural language text receives an input stream of text, identifies tokens within the stream of text, and processes the tokens to identify noun phrases. The system processes the tokens by annotating the tokens with tags identifying characteristics of the tokens and by contextually analyzing each token and its associated characteristics. During processing, the system can also disambiguate individual token characteristics and identify agreement between tokens.

39 Claims, 13 Drawing Sheets

| Field Description | 32-byte Prefix Position | Low Value | High Value | #Bits | Byte Pos | Mask | EN | FR | SP | IT | GR | SW | DU |
|---|---|---|---|---|---|---|---|---|---|---|---|---|---|
| CAPCODE | 9 | 0 | 5 | 3 | 0 | 0x07 | X | X | X | X | X | X | X |
| DIALECT | 3 | | | 4 | 0 | 0xF0 | X | X | X | X | X | X | X |
| HAS MANDATORY HYPHEN | 30 | | | 1 | 1 | 0x80 | | X | | X | X | X | X |
| IS DERIVATION | 4 | | | 1 | 1 | 0x40 | X | X | X | X | X | X | X |
| RESTRICTED/WORD FREQUENCY | 10-11 | | | 4 | 1 | 0x0F | X | X | X | X | X | X | X |
| RESERVED | | | | 2 | 1 | 0x30 | X | X | X | X | X | X | X |
| POS COMBINATION INDEX | 16-18 | | | 10 | 2<br>3 | 0xC0<br>0xFF | X | X | | X | X | X | X |
| NOUN INFLECTION PATTERN | 21-23 | | | 10 | 2<br>4 | 0x30<br>0xFF | X | X | | X | X | X | X |
| VERB INFLECTION PATTERN | 24-26 | | | 10 | 2<br>5 | 0x0C<br>0xFF | X | X | | X | X | X | X |
| ADJ/ADV INFLECTION PATTERN | 27-29 | | | 10 | 2<br>6 | 0x03<br>0xFF | X | X | | X | X | X | X |
| DERIVATION PATTERN | 5-8 | | | 12 | 7<br>8 | 0xFF<br>0xF0 | X | X | | X | X | X | X |
| COMPOUND INFO | 15 | | | 4 | 8 | 0x0F | X | X | | | | X | X |
| ERROR POSITION | N/A | | | 5 | 9 | 0xF8 | X | X | X | X | X | X | X |
| LMCC LINK LENGTH | 14 | | | 3 | 9 | 0x07 | X | X | X | X | X | X | X |
| FIELD OF INTEREST | | | | 6 | 10 | 0x3F | X | X | X | X | X | X | X |
| RESERVED | | | | 2 | 10 | 0xC0 | X | X | X | X | X | X | X |

FIG. 3

| INDEX | POS TAG(S) | OEM TAG(S) |
|---|---|---|
| 1 | NN | N |
| 2 | NN$ | N |
| 3 | NNS$ | N |
| 343 | ABN_NN_QL_RB | N_O_R |
| 344 | ABN_NN_NNS_QL_RB | N_O_R |
| 345 | ABN | O |
| 346 | ; | O |
| 347 | : | O |
| 348 | , | O |

*FIG. 4A*

| SUFFIX | POS INDEX |
|---|---|
| &bs | 004 |
| 'am | 001 |
| ... | |
| ôle | 001 |

*FIG. 4B*

| RULE 261 | (i-2) 260 | (i-1) 262 | (i) 264 | (i+1) 266 |
|---|---|---|---|---|
| 1 | | | IF BEGINNING OF SENTENCE & CAPCODE >000 & PART-OF-SPEECH TAG = NOUN, THEN COERCE PRIMARY PART-OF-SPEECH TAG TO SINGULAR COMMON NOUN 268 | |
| 2 | PRIMARY PART-OF-SPEECH TAG = ARTICLE 270 | | IF PRIMARY PART-OF-SPEECH TAG = VERB OR SECOND POSSESSIVE PRONOUN OR EXCLAMATION OR VERB PAST TENSE FORM & SECONDARY PART-OF-SPEECH TAG = SINGULAR COMMON NOUN, THEN PROMOTE SECONDARY PART-OF-SPEECH TAG 272 | |
| 3 | | PART-OF-SPEECH TAG = VERB INFINITIVE OR SINGULAR COMMON NOUN 274 | IF PRIMARY PART-OF-SPEECH TAG = VERB OR SECOND POSSESSIVE PRONOUN OR EXCLAMATION OR VERB PAST TENSE FORM & SECONDARY PART-OF-SPEECH TAG = SINGULAR COMMON NOUN, THEN PROMOTE SECONDARY PART-OF-SPEECH TAG 276 | |
| 4 | | PART-OF-SPEECH TAG = MODAL AUXILLARY OR SINGULAR COMMON NOUN 278 | IF PRIMARY PART-OF-SPEECH TAG = MODAL AUXILLIARY & SECONDARY PART-OF-SPEECH TAG = SINGULAR COMMON NOUN, THEN PROMOTE SECONDARY PART-OF-SPEECH TAG 280 | PART-OF-SPEECH TAG = INFINITIVE 282 |
| 5 | | PART-OF-SPEECH TAG = VERB INFINITIVE OR SINGULAR COMMON NOUN 284 | IF PRIMARY PART-OF-SPEECH TAG = VERB & SECONDARY PART-OF-SPEECH TAG = ADJECTIVE, THEN PROMOTE SECONDARY PART-OF-SPEECH TAG 286 | |
| 6 | | PART-OF-SPEECH TAG = VERB INFINITIVE OR SINGULAR COMMON NOUN 287 | IF PRIMARY PART-OF-SPEECH TAG = VERB & SECONDARY PART-OF-SPEECH TAG = COMPARATIVE ADJECTIVE, THEN PROMOTE SECONDARY PART-OF-SPEECH TAG 288 | |

*FIG. 9*

```
IF AGREEMENT CHECKS TWO TOKENS T1 AND T2:

REDUCE POS1...POSn ON T1 TO NOUN PHRASE TAGS (CN, JJ*, MM, NN*, ON)
  IF ANY OF THE REMAINING TAGS IS MARKED AS 'MATCHED'
    REDUCE THE SET TO ONLY 'MATCHED' TAGS

REDUCE POS1...POSn ON T2 TO AGREEMENT TAGS (CN, JJ*, MM, NN*, ON)
  IF ANY OF THE REMAINING TAGS IS MARKED AS 'MATCHED'
    REDUCE THE SET TO ONLY 'MATCHED' TAGS

FOR EVERY POSi ON T1
    FOR EVERY POSj ON T2
      IF EITHER POSi OR POSj IS A CN, MM, OR ON
        MARK POSi AND POSj AS 'MATCHED'
      ELSE IF LANGUAGE IS FR/IT/SP:
        IF THE INTERSECTION OF NUMBER ON POSi AND POSj IS NOT EMPTY AND
           THE INTERSECTION OF GENDER ON POSi AND POSj IS NOT EMPTY,
          MARK POSi AND POSj AS 'MATCHED'
      ELSE IF LANGUAGE IS GR:
        IF THE INTERSECTION OF NUMBER ON POSi AND POSj IS NOT EMPTY AND
           THE INTERSECTION OF GENDER ON POSi AND POSj IS NOT EMPTY,
           THE INTERSECTION OF CASE ON POS AND POS IS NOT EMPTY,
          MARK POSi AND POSj AS 'MATCHED'

IF AT LEAST ONE POSi ON T2 IS MARKED AS MATCHED, T1 AND T2 AGREE
  ELSE T1 AND T2 DON'T AGREE.
```

*FIG. 10*

```
IF TRUNCATION SWITCH IS TURNED ON:

IF NP CONSISTS OF 2 ELEMENTS ONLY:
    RETURN IT

ELSE IF LANGUAGE IS EN/GR:
      RETURN LAST TWO ELEMENTS OF NP                        (1)

ELSE IF LANGUAGE IS FR/IT/SP:
      IF NP CONTAINS SEQUENCE 'NN*+ DE + NN*':
        RETURN 'NN*+ DE + NN*'                              (2)

ELSE

FIND THE FIRST TOKEN IN THE NP WHICH
      HAS POS NN*

IF THIS NN* IS FOLLOWED BY ANOTHER TOKEN:
        RETURN THE NN* PLUS THE FOLLOWING TOKEN   (3)

ELSE RETURN THE NN* PLUS THE PRECEDING
           TOKEN                                            (4)
```

*FIG. 11*

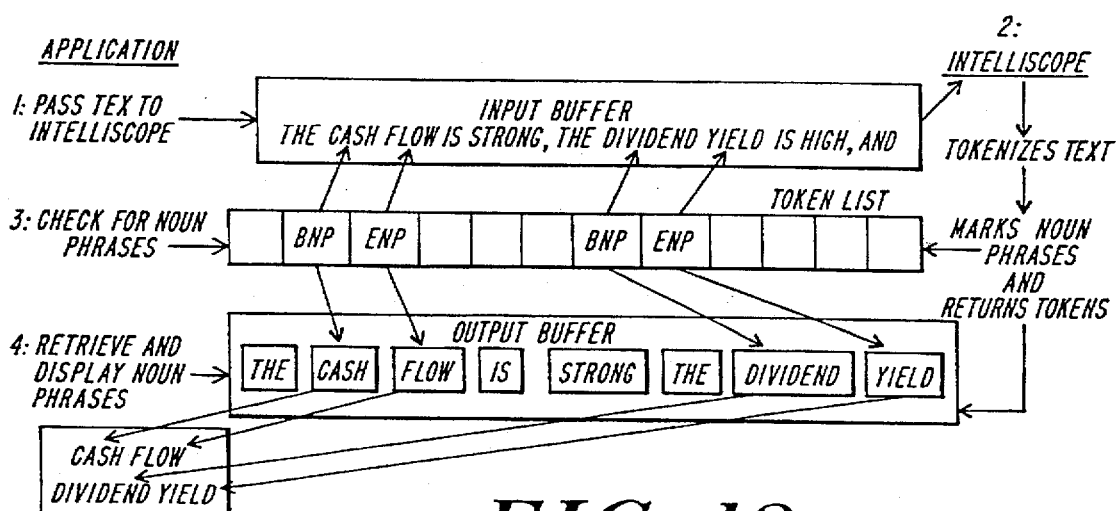

*FIG. 12*

METHOD AND APPARATUS FOR AUTOMATED SEARCH AND RETRIEVAL PROCESS

BACKGROUND OF THE INVENTION

This invention relates to methods and apparatus of automated language analysis systems. It provides systems embodied in a computer for receiving digitally encoded text composed in a natural language, and it provides systems for the grammatical analysis of encoded text. More particularly, the invention relates to a noun-phrase system for identifying noun phrases contained in natural language text.

Basic systems have been developed for the automatic recognition of syntactic information contained within a natural stream of text, as well as systems providing grammatical analysis of digitally encoded natural language text. Other prior systems contain sentence analysis techniques for forming noun phrases from words present in the encoded text. These prior noun phrase identifying techniques assign rankings to words within a stream of text based upon the probability of any individual word type being found within a noun phrase, and these techniques form noun phrases by analyzing the ranks of individual words within the stream of text.

One drawback of prior systems concerns the inflexibility of these systems and their inability to be effective with multiple languages. In particular, prior techniques use a combination of hard-coded rules and tables that can not be easily changed for use with different languages.

Another drawback to prior systems concerns the inaccuracy in forming noun phrases. The inaccuracies in prior systems result from the failure to disambiguate ambiguous words that have multiple part-of-speech tags. The prior systems also fail to consider the agreement rules relating to words found within a noun phrase. Moreover, earlier automated textual analysis systems failed to adequately address the contextual setting of each word within a noun phrase.

Accordingly, it is an object of the invention to provide an improved computer system for analyzing natural language text and thereby for improving the precision and recall of information retrieval systems.

Another object of the invention is to provide a contextual analysis system which identifies noun phrases by looking at a window of words surrounding each extracted word.

Further objects of the invention include providing a noun-phrase module containing a system for disambiguating the parts of speech of each extracted word.

Yet another object of the invention is to provide a noun-phrase analysis system capable of forming noun phrases wherein the words contained within the phrase are in agreement.

These and other objects of the invention will be apparent in the description that follows.

SUMMARY OF THE INVENTION

The invention attains these and other objects with a system for the grammatical analysis of digitally encoded textual material which extracts a sequence of token words from the natural language text, stores the sequence of token words in a memory element, determines a part-of-speech tag and grammatical features for each token word, and identifies tokens which can participate in the construction of noun phrases by contextually analyzing each of the tokens. The contextual analysis can include inspecting the part-of-speech tags and the grammatical features of each token in a window of extracted tokens.

In accordance with another aspect of the invention, the system forms a noun phrase from a stream of natural language words by extracting a sequence of tokens from the stream, storing the sequence of tokens in a memory element, determining a part-of-speech tag and grammatical features for each token, identifying tokens which can participate in the construction of noun phrase by inspecting the part-of-speech tags of successive tokens, and iteratively checking agreement between elements of the noun phrase found within the stream of text. Further in accordance with the invention, the system identifies a word contained within the noun phrase as the end of the noun phrase when the word in question does not agree with earlier words contained within the noun phrase.

Further embodiments of this invention check agreement between parts of the noun phrase by monitoring person, number, gender, and case agreement between the parts of the noun phrase, monitoring agreement in these categories between the parts of the noun phrase.

Further aspects of the invention provide for a system that extracts a sequence of tokens from the stream of natural language text, stores the sequence of tokens, determines at least one part-of-speech tag for each token, disambiguates the part-of-speech tags of a token having multiple part-of-speech tags by inspecting a window of sequential tokens surrounding the ambiguous word, and identifies the parts of a noun phrase by inspecting the part-of-speech tags of successive extracted tokens.

Another aspect of this invention provides for a system capable of promoting at least one of the secondary part-of-speech tags of an ambiguous token to the primary part-of-speech tag as a function of a window of sequential tokens surrounding the ambiguous token. The invention also provides a rule-based approach for replacing the primary part-of-speech tag with a generated primary part-of-speech tag, wherein the generated tag is formed as a function of the window of sequential tokens containing the ambiguous token.

Additional aspects of the invention provide methods and apparatus for determining the part-of-speech tags associated with each token. In one embodiment of this aspect of the invention, the system provides for a first addressable table containing a list of lexical expressions with each lexical expression being associated with at least one part-of-speech tag. The extracted words can be located within the first addressable table and thereby become associated with at least one part-of-speech tag. In an alternate embodiment, the invention provides for a second addressable table containing a list of stored suffixes with each stored suffix being associated with at least one part-of-speech tag. The last three characters of an extracted word can be referenced against one of the suffixes contained in the second addressable table and thereby become associated with at least one part-of-speech tag. The invention further provides for a step of associating a default part-of-speech tag of "noun" with an extracted token.

The invention provides a system which enables people to enhance the quality of their writing and to use information more effectively. The noun-phrase analyzer is a powerful software tool that hardware and software manufacturers can integrate into applications to help end-users find and retrieve information quickly and easily in multiple languages. The invention achieves this by providing a linguistically intelligent approach to index pre-processing, search pre-processing, and search expansion. For example, the invention provides an index pre-processor that identifies the form and function of words and phrases in the source of text or database and converts them to the appropriate forms for indexing. In particular, the invention can distinguish between noun phrases such as "Emergency Broadcast System" and the individual words "emergency", "broadcast", and "system", thereby ensuring that the index entries more accurately reflect the content. The invention thus improves information retrieval systems by intelligently increasing the recall (i.e., the ratio of relevant items retrieved to the total number of relevant items) and precision (i.e., the ratio of relevant items retrieved to the total number of retrieved items) of index pre-processing, search pre-processing, and search expansion.

BRIEF DESCRIPTION OF THE DRAWINGS

FIG. 3 shows a work data table utilized by the processor of FIG. 1;

FIG. 4A illustrates a part-of-speech combination table referenced by the word data table of FIG. 3;

FIG. 4B illustrates a suffix table for referencing entries in the part-of-speech combination table of FIG. 4A;

FIGS. 7A–7I show flow charts for the tokenizer module illustrated in FIG. 6;

FIG. 9 is a representative table of rules for the disambiguator shown in FIG. 6;

FIG. 10 illustrates pseudocode for the agreement checker of FIG. 6;

FIG. 11 contains pseudocode for the noun-phrase truncator of FIG. 6; and

FIG. 12 illustrates an example of noun-phrase analysis in accordance with the invention.

DETAILED DESCRIPTION OF THE DRAWINGS

Figure 1:
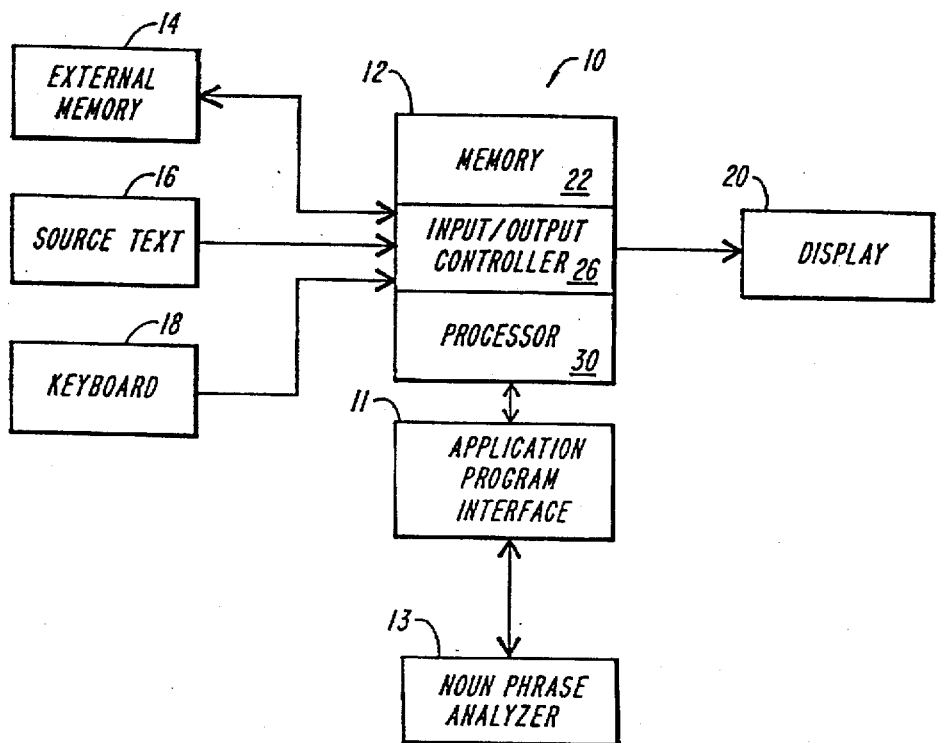
FIG. 1 is a block diagram of a programmable multilingual text processor according to the present invention.

FIG. 1 illustrates a multilingual text processor 10 in accordance with the invention. The text processor 10 includes a digital computer 12, an external memory 14, a source of text 16, a keyboard 18, a display 20, an application program interface 11, and a noun-phrase analyzer 13. Digital computer 12 includes a memory element 22, a input/output controller 26, and a programmable processor 30.

Many of the elements of the multilingual text processor 10 can be selected from any of numerous commercially available devices. For example, digital computer 12 can be a UNIQ 486/33 MHz personal computer; external memory 14 can be a high speed non-volatile storage device, such as a SCSI hard drive; integral memory 22 can be 16 MB of RAM; keyboard 18 can be a standard computer keyboard; and display 20 can be a video monitor. In operation, keyboard 18 and display 20 provide structural elements for interfacing with a user of the multilingual text processor 10. In particular, keyboard 18 inputs user typed commands and display 20 outputs for viewing signal generated by the text processor 10.

The External memory 14 is coupled with the digital computer 12, preferably through the Input/Output Controller 26. Data stored in the External Memory 14 can be downloaded to memory element 22, and data stored in the memory 22 can be correspondingly uploaded to the external memory 14. The external memory 14 can contain various tables utilized by the digital computer 12 to analyze a noun phrase.

The source of text 16 can be another application program, a keyboard, a communications link, or a data storage device. In either case, the source of text generates and outputs to the digital computer 12 a stream of natural language text. Alternatively, the digital computer 12 may receive as an input from the source of text 16 sentences of encoded text with sentence boundary markers inserted. Sentence splitting per se is known in the art, and is disclosed in Kucera et al., U.S. Pat. No. 4,773,009, entitled Method and Apparatus for Text Analysis. Preferably, the stream of natural language text with identified sentence boundaries enters the digital computer 12 at the Input/Output controller 26.

The Input/Output controller 26 organizes and controls the flow of data between the digital computer 12 and external accessories, such as external memory 14, keyboard 18, display 20, and the source of text 16. Input/Output controllers are known in the art, and frequently are an integral part of standard digital computers sold in the market today.

Application Program Interface 11 includes a set of closely related functions, data types, and operations used in interfacing the computer 12 with the noun-phrase analyzer 13. In particular, the application program interface 11 comprises four functional elements: App Block, Database Block, Word Block, and Buffer Block. The App Block initiates an application instance, assigns an identification number to it, and passes user processing options to the Noun-phrase Analyzer 13. The Database Block initializes a database that provides linguistic information about a language. Word Block performs operations on individual words obtained from source text 16, and Buffer Block performs operations on an entire buffer of text obtained from source text 16. Each of the functional elements, i.e., App, Database, Word, and Buffer, contained in interface 11 have associated data structures used to pass information to the noun-phrase analyzer 13 before processing and to return information from the Application Program Interface 11 after processing by the analyzer 13.

The four main functional elements contained in interface 11 perform operations on data structures formed by the application program interface 11. Memory for these functional elements and their associated databases are supplied by the digital computer 12 through the utilization of memory in internal memory element 22 and in external memory element 14.

In operation, App Block is the first functional block called. App Block initiates a session in the noun-phrase analyzer 13 and assigns a number to the session that uniquely identifies the session. The identifying number is used to track the allocated memory and execution status and to automatically free the memory once the session ends.

Next, Database block is accessed in order to initialize a language database. The language databases provide linguistic information for processing text in a particular language and are used by the noun-phrase analyzer 13. Multiple languages can be processed during any particular session if multiple calls to the database block are made during the session.

After initializing a session by calling App Block and initializing a database by calling Database block, either Word Block or Buffer Block is called, depending on whether a larger amount of text is being processed or one word at a time is being handled. The digital computer 12 fills an input buffer in the application program interface 11 with data from the source text 16, and then calls either Word Block or Buffer Block to begin processing of the text by analyzer 13. Following the call, the noun-phrase analyzer 13 scan the input buffer, and creates a stream of tokens in the output buffer and an array that correlates the input and output buffers.

Figure 2:
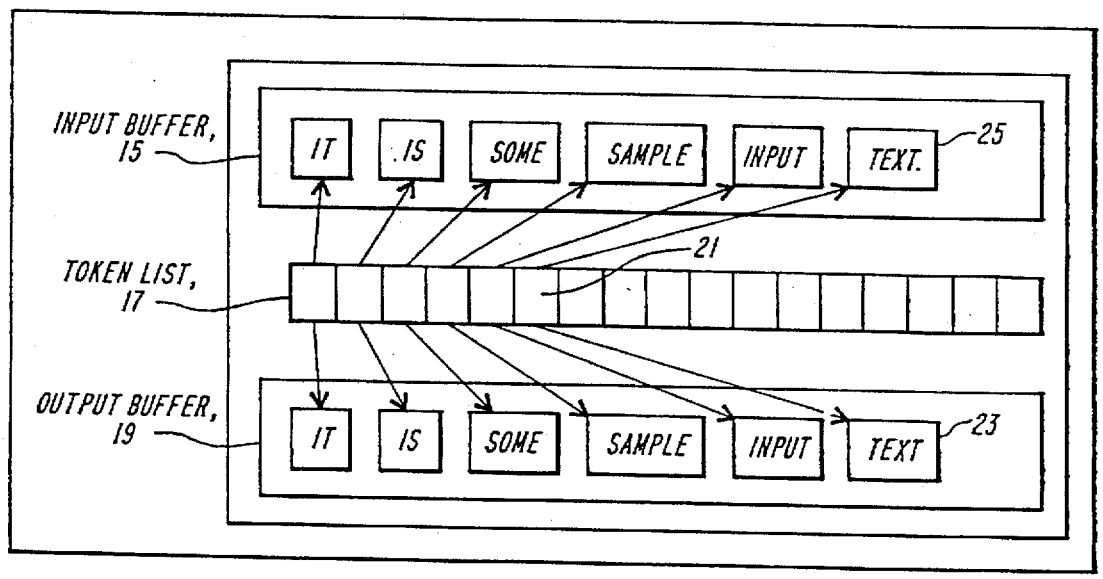
FIG. 2 illustrates a group of data structures formed by the processor of FIG. 1 according to one practice of the invention.

FIG. 2 illustrates the operation of multilingual processor 10. In particular, FIG. 2 shows an input buffer 15, a token list 17, and an output buffer 19. The source of text 16 supplies a stream of natural language text to input/output controller 26 that in turn routes the text to processor 30. Processor 30 supplies the application program interface 11 with the stream of text, and places the text in the input buffer 15. Processor 30 initiates operation of the noun-phrase analyzer 13 by making the calls to the interface 11, as described above.

Noun-phrase analyzer 13 operates upon the text contained in input buffer 15 and generates and places in the interface 11 the token list 17 and the output buffer 19. Token list 17 is an array of tokens that describes the relationship between the input and output data. Token list 17 contains a token 21 for each output word 23. Each token 21 links an input word 25 with its corresponding output word 23 by pointing to both the input word 25 and the output word 23. In addition to linking the input and output, each token describes the words they identify. For example, each token 21 can point to a memory address storing information regarding the particular token. Information associated with each particular token can include, the part-of-speech of the token, the capitalization code of the token, the noise status of the token, and whether the token is a member of a noun phrase.

In operation, computer 12 obtains a buffer of text from source of text 16, relevant language databases from either the external memory 14 or the internal memory 22, and user selected operations from keyboard 18. Computer 12 then outputs to interface 11 a buffer of text 15, an empty output buffer 19, and the specific operations to be performed on the buffer of text. Noun-phrase analyzer 13 then performs the specified operations on the buffer of text 15 and places the generated output into the output buffer 19 and places the token list 17 that correlates the input buffer of text 15 with the output buffer 19 into the application program interface 11.

FIG. 3 illustrates a word data table 31 used in conjunction with the multilingual text processor 10. Word data table 31 includes digital codings representative of a list of expressions labeled Exp. $N_1$ through Exp. $N_m$. The word data table acts as a dictionary of expressions, wherein each expressions contains a pointer to an entry, such as the representative entry 33. Various word data tables exist, each being representative of either different languages, dialects, technical language fields, or any subgroup of lexical expressions that can be processed by text processor 30.

The word data table 31 can be an addressable table, such as an 11 byte RAM table stored in a portion of either the external memory 14 or in the memory 12. Each representative entry 33 in the word data table describes the characteristics of one or more words. In particular, entry 33 contains a column, labeled item 35, that describes a particular characteristic of a word. Entry 33 also contains a column, labeled item 37, that identifies which bytes, out of a possible 32-byte prefix position, identify a particular characteristic of the word. For example, particular bytes in the 32-byte prefix position can contain bytes representative of a particular word characteristic, such as the capitalization code of word, or particular bits in the 32-byte prefix position can contain bytes that point to a portion of memory in either memory element 22 or memory element 14 that include information pertaining to a particular characteristic of the word, such as the parts of speech of a word.

Characteristics of a word stored in representative entry 33 include the part-of-speech combination index of a word, and the grammatical features of the word. In particular the part-of-speech combination index of a word is identified by the labeled field 44 in FIG. 3, while the grammatical features of the word are identified by the labeled fields 32, 34, 36, 38, 40, 42, 46, 48, 50, 52, 54, 56, 58, and 60 in FIG. 3. Additional grammatical features of a word include the word length, the language code, whether the word is an abbreviation, and whether the word is a contraction. Although not shown in FIG. 3, addresses to these additional grammatical features of a word can be stored in a representative entry 33. For example, positions 12–13 in the 32-byte prefix location can identify the word length; positions 1–2 in the 32-byte prefix location can identify the language code; position 19 can indicate whether the word is an abbreviation; and position 20 can indicate whether the word is a contraction. The preferred implementation is for the byte values in the 32-byte prefix to be encoded in a compressed form.

The Capcode field 32 identifies the capitalization of the word. For example, Capcode field 32 can store a binary number representative of the capitalization characteristics of the word, such as: "000" can represent all lowercase letters; "001" can represent initial letter uppercase; "010" can represent all uppercase letters; "011" can represent the use of a capitalization map (mixed capitalization); "100" can represent no capitalization, unless the word is located at the beginning of a sentence; and "101" can represent that capitalization is not applicable.

The Dialect field 34 is used to identify words properly spelled in one dialect, but improperly spelled in another dialect. A common example of this behavior can be demonstrated using the American term "color" and the British term "colour". This field is generally accessed during the decoding process to filter words based on the dialect of the word.

The Has Mandatory Hyphen field 36 stores information about words which change spelling when hyphenated at the ends of lines. In Germanic languages, the spelling of a word may change if it is hyphenated. This information can be encoded for both the hyphenated and unhyphenated forms of a word. The presence or absence of the hyphen at the Error Position is enough to identify whether the word is correctly or incorrectly spelled. An example is the German word "bak-ken", which is the form of the word used when it is hyphenated; without the hyphen, the word is spelled "backen". This information links the hyphenated form with its unhyphenated form which would be the form normally used for such information retrieval tasks as indexing.

The Is Derivation field 38 is used to identify whether a word is a derivation (i.e., is a derived form of a root and therefore should use the derivation pattern to find the root form) or a derivational root (in which case the derivation pattern is used to produce the derived forms of the root). For example, the word "readable" is a derived form of the derivational root "read".

The Restricted/Word-Frequency field 40 is used to store the word-frequency information about words in the word data table.

The POS Combination Index field 44 stores an index into the part-of-speech combination table 62, as illustrated in FIG. 4. The part-of-speech combination table contains a list of parts of speech that a word can take. The parts of speech are stored with the most frequent part-of-speech tag listed first in the part-of-speech combination table. The order of the other parts of speech in this table is unspecified, but implied to be in reverse frequency order. English lists about 650 entries in this table, French about 1900, Swedish about 2000. Other languages fall within this range.

The Noun Inflection Pattern field 46, the Verb Inflection Pattern Field 48, and the Adj/Adv Inflection Pattern field 50 give the respective pattern numbers used in inflecting or uninflecting noun, verb, and adjective/adverb forms. The pattern number indexes a separate table of inflectional endings and their parts of speech. Thus, there is an index to the noun inflection pattern of the word, an index to the verb inflection pattern of the word, and an index to the inflection pattern representative of the inflections of both the adjective and adverbial forms of the word.

The Derivation Pattern field 52 contains information about how to derive or underive words from this particular word. Derivation patterns are much like inflection patterns. The derivation pattern is an index into a table of derivational endings and their parts of speech. The Is Derivation field 38 described above tells whether the pattern should be used for deriving or underiving. If the bit contained within the Is Derivation field 38 is not set, the word is a derivational root.

The Compound Info field 54 indexes another lookup table identifying rules regarding the compounding characteristics of the word. The lookup table contains fields, including a left-most compound component, a right-most compound component, that identify possible positions where the word can be used as a component in a compound word. This information is used for Germanic languages to decompose compounds into their constituents. For example, the German compound "Versicherungsgesellschaft" ("insurance company") can be decomposed into "Versicherung" (its left-most compound component) and "Gesellschaft" (its right-most compound component).

The Error Position field 56 specifies the position of a spelling-changing hyphen.

The LMCC Link Length field 58 specifies the length of the compound link and is only used for words marked as being a Left Most Compound Component. In the example above, the left-most compound component "Versicherung" has a Link Field of 1 since the single character "s" is used as its compound link.

The Field of Interest field 60 describes the topic or domain of the given entry. For example, field 60 can differentiate terms used exclusively in medicine from those that are used exclusively in law.

FIG. 4A and 4B illustrate other tables used by the multilingual text processor and stored in portions of either external memory 14 or internal memory 22. In particular, FIG. 4A shows a Part-of-Speech Combination Table 62 containing a list of indexes 64, a list of part-of-speech tags 66, and a list of OEM tags 68; and FIG. 4B shows a Suffix Table 70 having a list of suffixes 72 and having a list of POS indexes 74 to the part-of-speech combination table 62.

These tables can be modified according to particular languages, such that the tables can provide linguistic information for processing text in a particular language. Text processing system 10 can load tables associated with particular language databases when the database block of the application program interface 11 is initialized. This advantageously allows the databases to change without affecting the source code of the application program interface 11 or the noun-phrase analyzer 13. Thus, in effect the source code becomes independent of the language being processed. Further in accordance with this invention, multiple languages can be processed by creating a database instance for each language being processed. The languages can be selected from either English, German, Spanish, Portuguese, French, Dutch, Italian, Swedish, or Japanese. These particular languages are representative of languages having their own specific rules and tables for analyzing noun phrases, but are not included as a limitation of the invention.

As shown in FIG. 4A, each entry in part-of-speech combination table 62 contains an index 64 having one or more associated part-of-speech tags 66 and having an associated Original Equipment Manufacturer (i.e. "OEM") tag 68. Each index 64 in table 62 identifies one or more part-of-speech tags 66. Thus, all words contained within the word data table are associated with one or more part-of-speech tag 66. If the part-of-speech tag entry 66 includes multiple part-of-speech tags, the most probable tag is the first tag in the entry 66. For example, as illustrated in FIG. 4A, if the Index 64 of a word is 1, the word has a single part-of-speech tag 66 of NN (used to identify generic singular nouns); and if the Index 64 of a word is 344, the word has five possible part-of-speech tags. Furthermore, a word indexed to 344 in the combination table has a most probable part-of-speech tag of ABN (used to identify pre-qualifiers such as "half" and "all"), and also has part-of-speech tags of NN (used to identify generic singular nouns), NNS (used to identify generic plural nouns), QL (used to identify qualifying adverbs), and RB (used to identify generic adverbs).

FIG. 4B illustrates a Suffix table 70 having a list of suffixes 72 and having a list of POS indexes 74 to the part-of-speech combination table 62. Thus, each entry in table 70 has a suffix 72 associated with a POS index 74. In operation, the suffix of a word contained in a stream of text can be compared with suffix entries 72 in table 70. If a match is found for the suffix of the extracted word, then the word can be associated with a part-of-speech tag 66 in part-of-speech table 62 through POS index 74. For example, if a word in the stream of text contains a suffix, "ôle" (as in rôle), that word can be identified in table 70 and be associated with a part-of-speech index "001". The part-of-speech index "001" contains a part-of-speech tag NN (noun), as illustrated in FIG. 4A. Similarly, the word in the stream of text having a suffix "'am" (as in m'am) can be associated with a part-of-speech tag of NN through tables 62 and 70.

Figure 5:
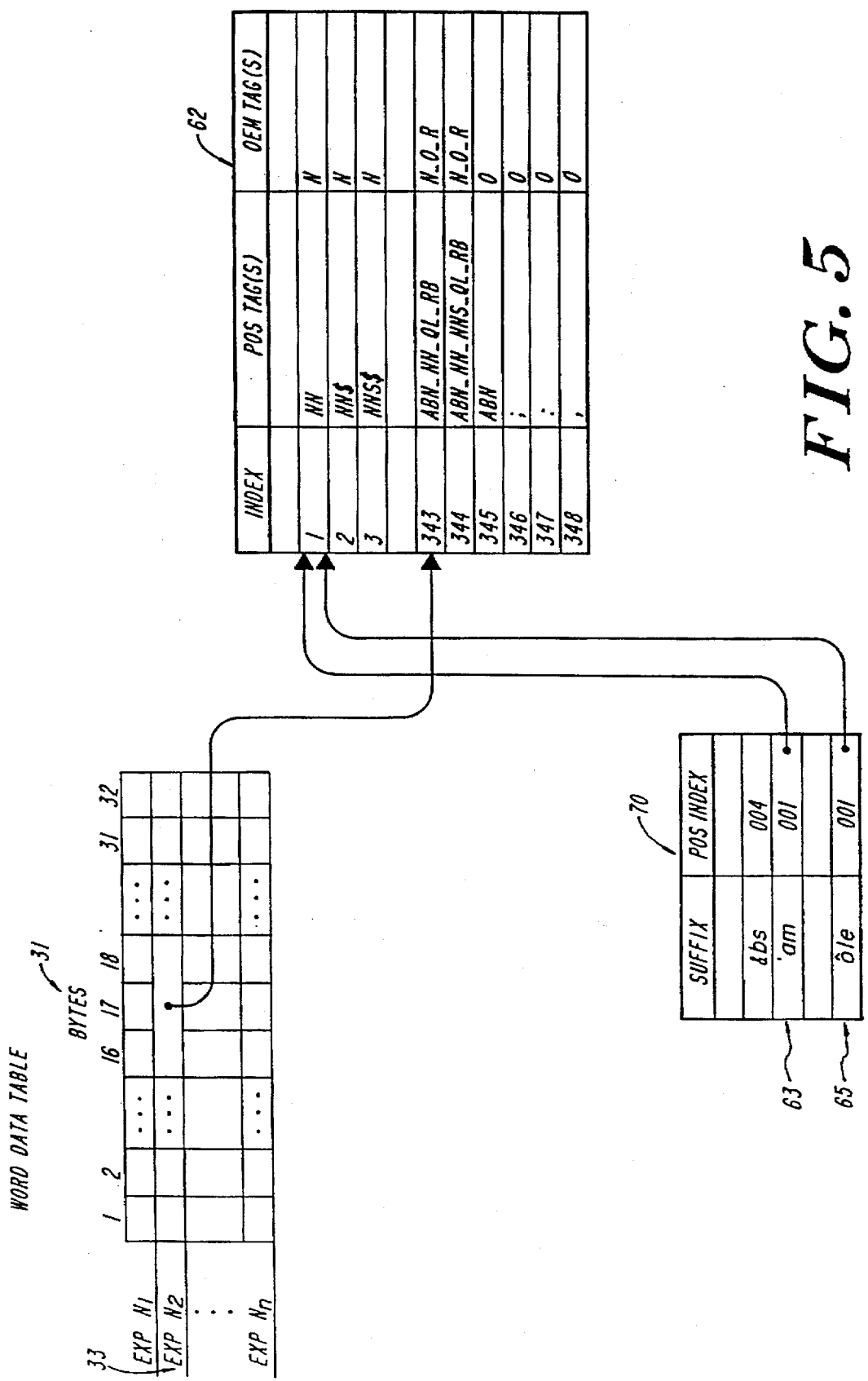
FIG. 5 illustrates possible associations between the table of FIG. 3, FIG. 4A and FIG. 4B.
Figure 7A:
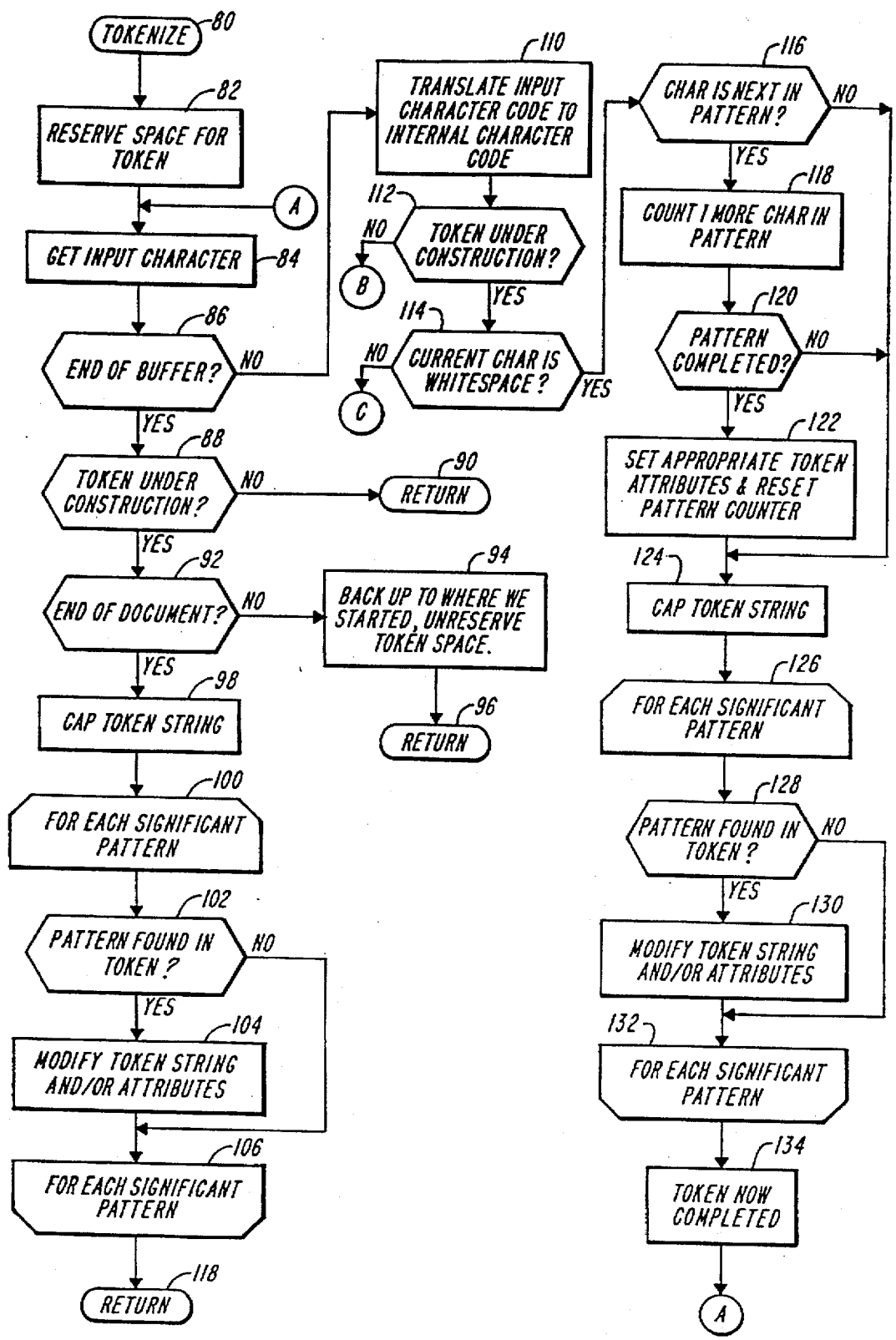
Figure 7B:
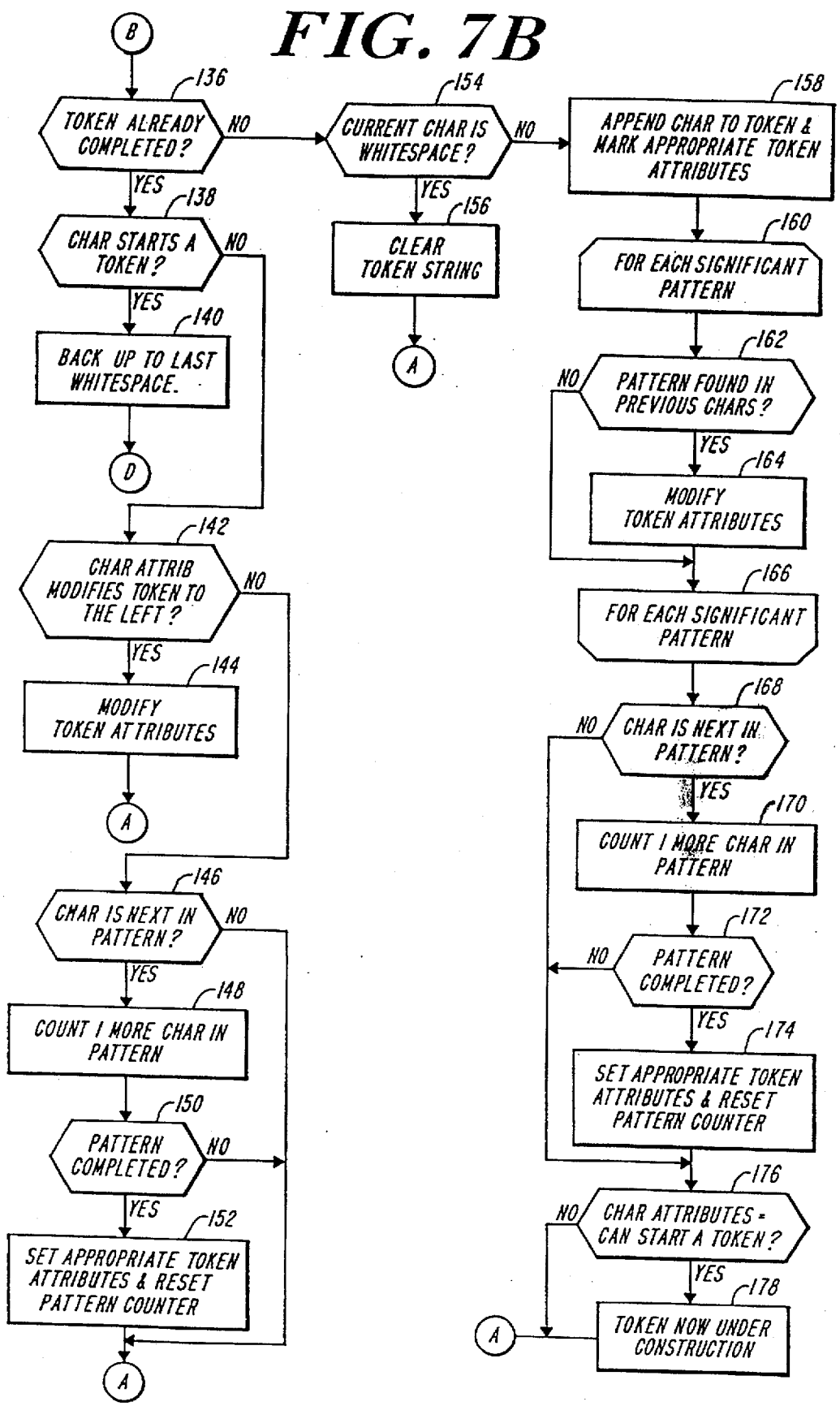
Figure 7C:
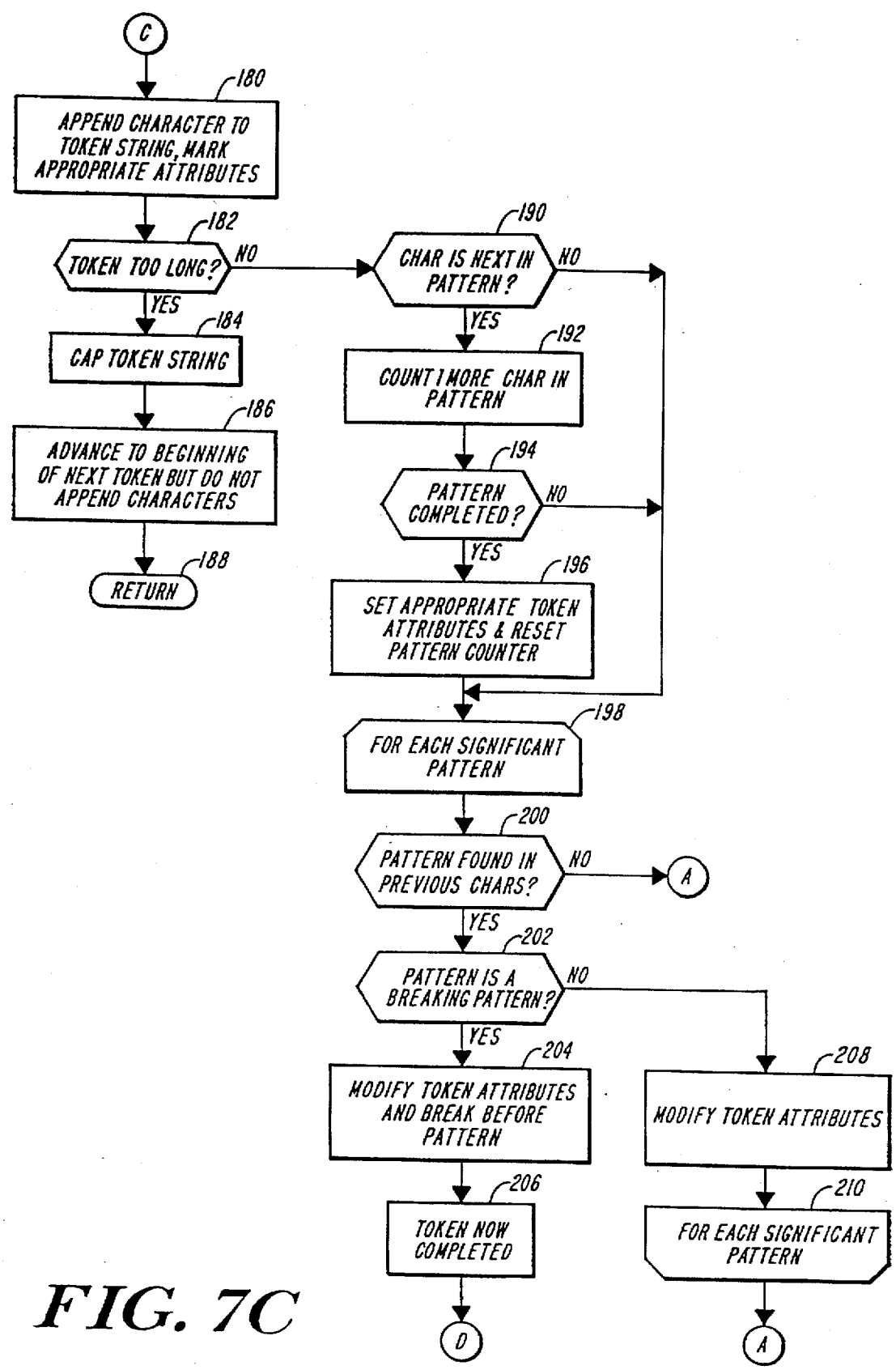
Figure 7D:
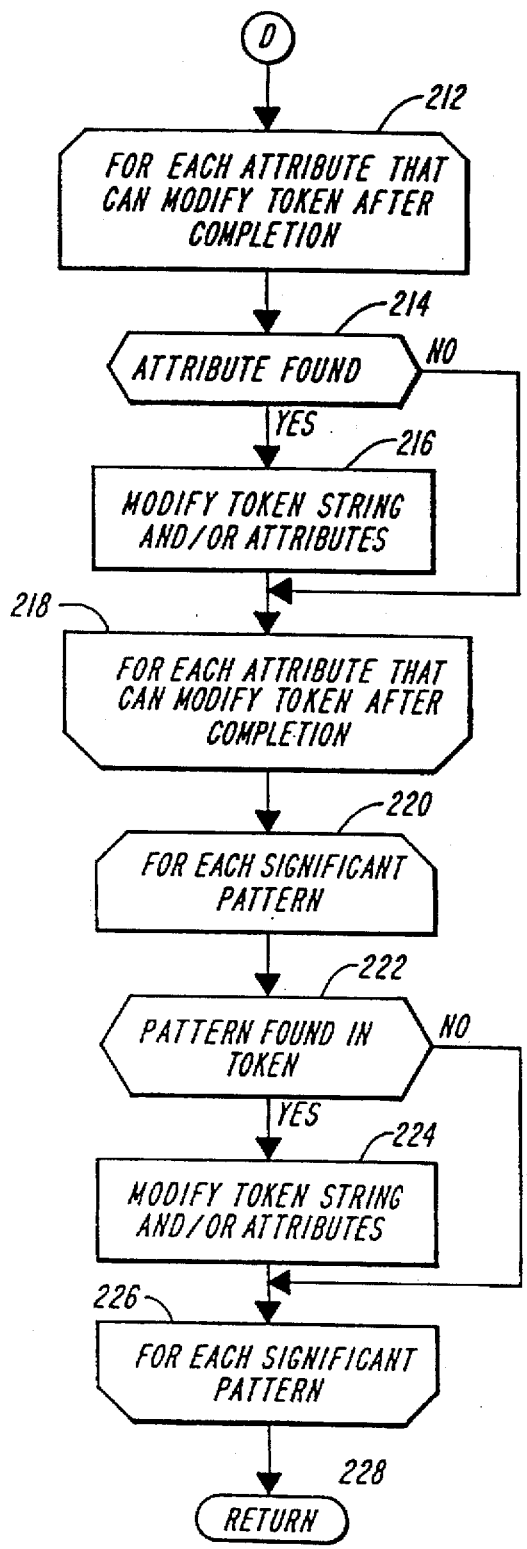

FIG. 5 illustrates a database system stored in various portions of memory elements 14 and 22 showing a connection between tables 31, 62, and 70 for associating part-of-speech tags with various lexical expressions contained within a stream of text. An Expression $N_2$ contained with the stream of text can be identified in the word data table 31 as representative entry 33. Representative entry 33 encodes the information contained in a 32-byte prefix, of which bytes 16–18 contain a code found in the part-of-speech combination table 62. This table in its turn relates this particular part-of-speech combination with index 343 in table 62, thereby associating the part-of-speech tags of ABN (pre-qualifier), NN (noun), QL (qualifying adverb), and RB (adverb) with Expression $N_2$.

In accordance with a further aspect of the invention, a part-of-speech tag can be associated with an expression in the stream of text through the use of suffix table 70. For example, a first expression in stream of text might contain a suffix "ôle", and can be identified in suffix table 70 as representative entry 63. A second expression in the stream of text might contain the suffix "ôle", and can be identified in suffix table 70 as representative entry 65. The pointer in representative entry 63 point to index 1 in table 62, and the pointer in representative entry 65 points to index 1 in table 62. Thus, both the first and second expression in the stream of text become associated with the part-of-speech tag of NN.

Figure 6:
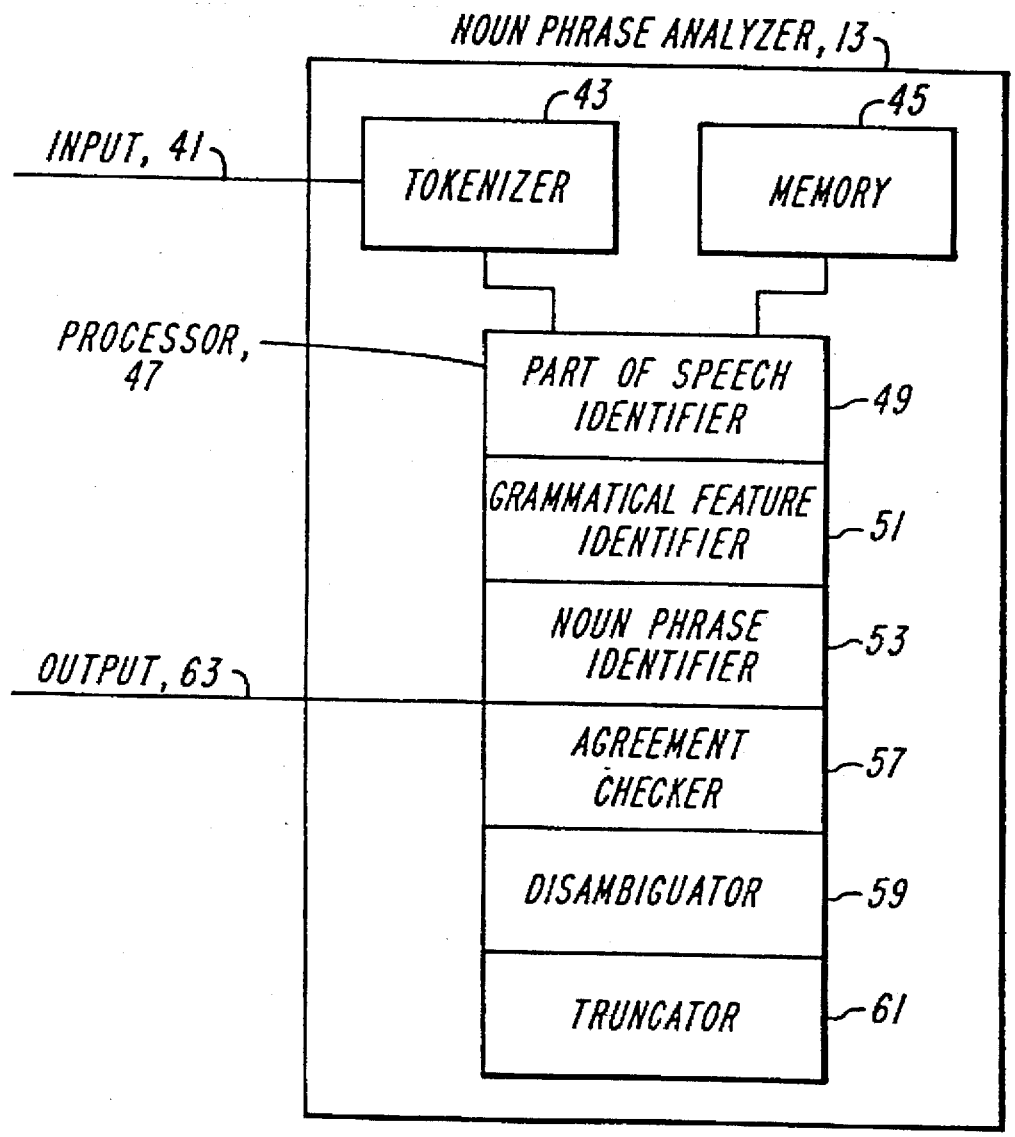
FIG. 6 is a detailed block diagram of a noun-phrase analyzer contained within the text process of FIG. 1.

FIG. 6 shows a block diagram of a noun-phrase analyzer 13 for identifying noun phrases contained within a stream of natural language text. The analyzer 13 comprises a tokenizer 43, a memory element 45, and a processor 47 having: a part-of-speech identifier 49, a grammatical feature identifier 51, a noun-phase identifier 53, an agreement checker 57, a disambiguator 59, and a noun-phrase truncator 61. Internal connection lines are shown both between the tokenizer 43 and the processor 47, and between the memory element 45 and the processor 47. FIG. 6 further illustrates an input line 41 to the tokenizer 43 from the application program interface 11 and an output line from the processor 47 to the application program interface 11.

Tokenizer 43 extracts tokens (i.e., white-space delimited strings with leading and trailing punctuation removed) from a stream of natural language text. The stream of natural language text is obtained from text source 16 through the application program interface 11. Systems capable of removing and identifying white-space delimited strings are known in the art and can be used herein as part of the noun-phrase analyzer 13. The extracted tokens are further processed by processor 47 to determine whether the extracted tokens are members of a noun phrase.

As illustrated in FIGS. 7A–7I, tokenizer 43 can comprise a system for extracting lexical matter from the stream of text and a system for filtering the stream of text. Tokenizer 43 receives input from input line 41 in the form of a text stream consisting of alternating lexical and non-lexical matter; accordingly, lexical tokens are separated by non-lexical matter. Lexical matter can be broadly defined as information that can be found in a lexicon or dictionary, and is relevant for Information Retrieval Processes. Tokenizer 43 identifies the lexical matter as a token, and assigns the attributes of the token into a bit map. The attributes of the non-lexical matter following the lexical token are mapped into another bit map and associated with the token. Tokenizer 43 can further tag or identify those tokens that are candidates for further linguistic processing. This filtering effect by the tokenizer 43 reduces the amount of data processed and increases the overall system throughput.

This implementation of tokenizer 28 has several benefits. It achieves high throughput; it generates information about each token during a first pass across the input stream of text; it eliminates and reduces multiple scans per token; it does not require the accessing of a database; it is sensitive to changes in language; and it generates sufficient information to perform sophisticated linguistic processing on the stream of text. Moreover, tokenizer 28 allows the non-lexical matter following each token to be processed in one call. Additionally, tokenizer 28 achieves these goals while simultaneously storing the properties of the non-lexical string in less space than is required to store the actual string.

Memory element 45, as illustrated in FIG. 5, can be a separate addressable memory element dedicated to the noun-phrase analyzer 13, or it can be a portion of either internal memory element 22 or external memory element 14. Memory element 5 provides a space for storing digital signals being processed or generated by the tokenizer 43 and the processor 47. For example, memory element 14 can store tokens generated by tokenizer 43, and can store various attributes identified with a particular token by processor 47. In another aspect of the invention, memory element 14 provides a place for storing a sequence of tokens along with their associated characteristics, called a window of tokens. The window of tokens is utilized by the processor to identify characteristics of a particular candidate token by evaluating the tokens surrounding the candidate token in the window of extracted tokens.

Processor 47, as illustrated in FIG. 6, operates on the extracted tokens with various modules to form noun phrases. These modules can be hard-wired digital circuitry performing functions or they can be software instructions implemented by a data processing unit performing the same functions. Particular modules used by processor 47 to implement noun-phrase analysis include modules that: identify the part of speech of the extracted tokens, identify the grammatical features of the extracted tokens, disambiguate the extracted tokens, identify agreement between extracted tokens, and identify the boundaries of noun phrases.

Figure 8:
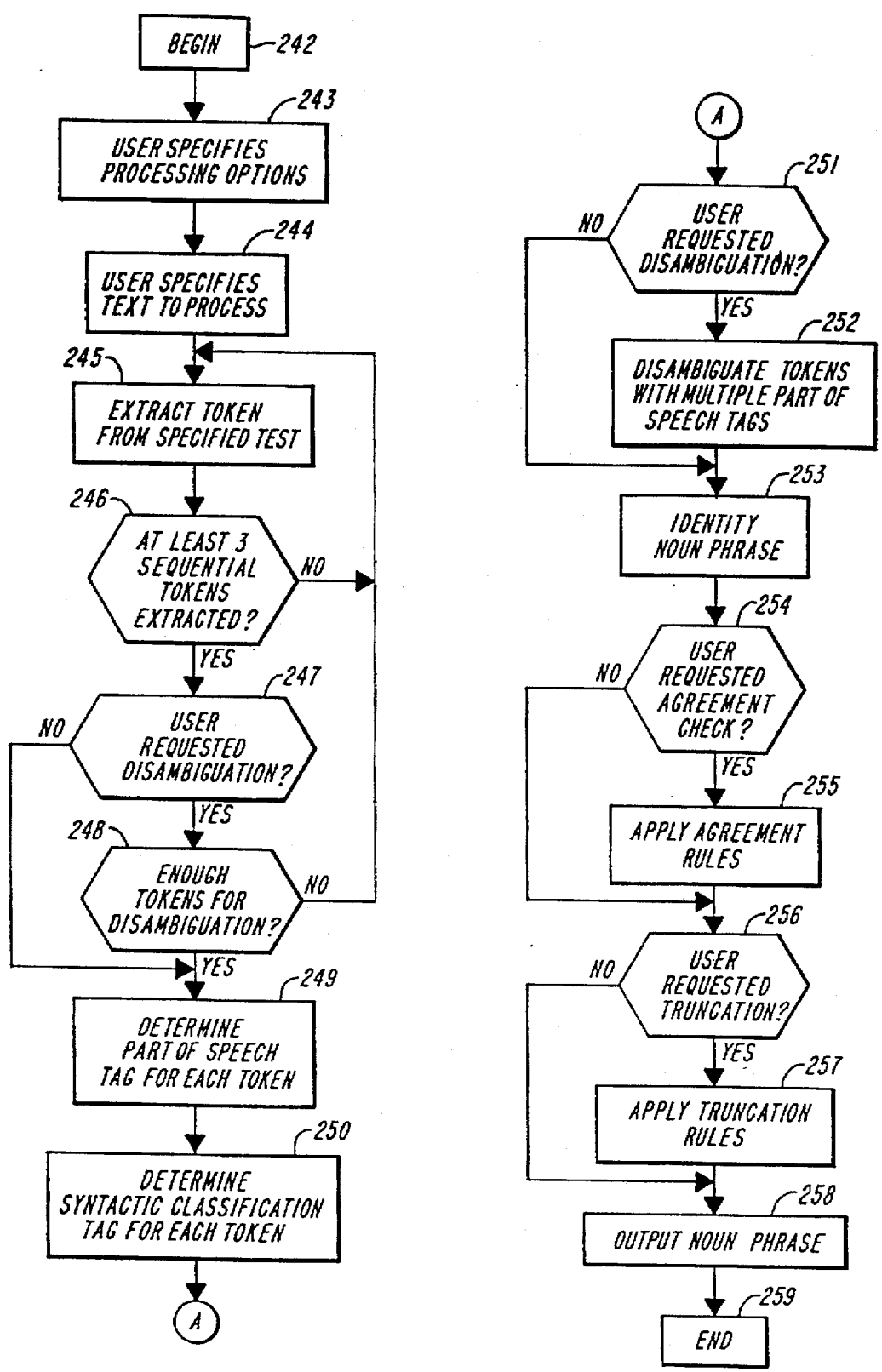
FIG. 8 is a flow chart for the processor shown in FIG. 6.

FIG. 8 depicts a processing sequence of noun-phrase analyzer 13 for forming noun phrases, that begins at step 242. At step 243, the user-specified options are input to the noun-phrase analysis system. In particular, those options identified by the user through an input device, such as keyboard 18, are input to text processor 10 and channeled through the program interface 11 to the noun-phrase analyzer 13. The user selected options control certain processing steps within the noun-phrase analyzer as detailed below. At step 244, the user also specifies the text to be processed. The specified text is generally input from source text 16, although the text can additionally be internally generated within the digital computer 12. The specified text is channeled through the application program interface 11 to the noun-phrase analyzer 13 within the Buffer Block. Logical flow proceeds from box 244 to box 245.

At action box 245 tokenizer 43 extracts a token from the stream of text specified by the user. In one embodiment, the tokenizer extracts a first token representative of the first lexical expression contained in the stream of natural language text and continues to extract tokens representative of each succeeding lexical expression contained in the identified stream of text. In this embodiment, the tokenizer continues extracting tokens until either a buffer, such as memory element 45, is full of the extracted tokens or until the tokenizer reaches the end of the text stream input by the user. Thus, in one aspect the tokenizer extracts tokens from the stream of text one token at a time while in a second aspect the tokenizer tokenizes an entire stream of text without interruption.

Decision box 246 branches logical control depending upon whether or not three sequential tokens have been extracted from the stream of text by tokenizer 43. At least three sequential tokens have to be extracted to identify noun phrases contained within the stream of text. The noun-phrase analyzer 13 is a contextual analysis system that identifies noun phrases based on a window of token containing a candidate token and at least one token preceding the candidate token and one token following the candidate token in the stream of text. If at least three tokens have not yet been extracted, control branches back to action box 245 for further token extraction, while if three tokens have been extracted logical flow proceeds to decision box 247.

At decision box 247 the system identifies whether the user-requested disambiguation of the part of speech of the tokens. If the user has not requested part-of-speech disambiguation control proceeds to action box 249. If the user has requested part-of-speech disambiguation logical control flow to decision box 248 wherein the system determines whether or not disambiguation can be performed. The noun-phrase analyzer 13 disambiguates tokens within the stream of natural language text by performing further contextual analysis. In particular, the disambiguator analyzes a window of at past four sequential tokens to disambiguate part of speech of a candidate token. In one aspect the window of token contains the two tokens preceding an ambiguous candidate token, the ambiguous candidate token itself, and a token following the ambiguous candidate token in the stream of text. Thus, in accordance with this aspect, if four sequential tokens have not been extracted logical flow branches back to action box 245 to extract further tokens from the stream of text, and if four sequential tokens have been extracted from the stream of text logical flow proceeds to action box 249.

At action box 249, the part-of-speech identification module 49 of processor 47 determines the part-of-speech tags for tokens extracted from the stream of text. The part-of-speech tag for each token can be determined by various approaches, including: table-driven, suffix-matching, and default tagging methods. Once a part-of-speech tag is determined for each token, the part-of-speech tag becomes associated with each respective token. After step 249, each token 21 in token list 17 preferably contains the most probable part-of-speech tag and contains a pointer to an address in a memory element containing a list of other potential part-of-speech tags.

In accordance with the table driven aspect of the invention, the part-of-speech tag of a token can be determined using the tables shown in FIGS. 3–5. For example, a representative lexical expression equivalent to the extracted token can be located in the word data table 31 of FIG. 2. As shown in FIG. 2–FIG. 5, module 49 can then follow the pointer, contained in bytes 16–18 of the representative expression in word table 31, to an index 64 in the part-of-speech combination table 62. The index 64 allows module 49 to access a field 66 containing one or more part-of-speech tags. Module 49 at processor 47 can then retrieve these part-of-speech tags or store the index to the part-of-speech tags with the extracted token.

This table-driven approach for identifying the part-of-speech tags of extracted words advantageously provides a fast and efficient way of identifying and associating a parts of speech with each extracted word. The word data table and the POS Combination Table further provide flexibility by providing the system the ability to change its part-of-speech tags in association with the various language databases. For example, new tables can be easily downloaded into external memory 14 or memory 22 of the noun-phrase system without changing any other sections of the multilingual text processor 10.

In accordance with the suffix-matching aspect of the invention, the part-of-speech tag of a token can be determined using the tables shown in FIGS. 4–5. For example, module 49 at processor 47 can identify a representative suffix consisting of the last end characters of the extracted token in suffix table 70 of FIG. 4B. Once a matching suffix is identified in suffix table 70, module 49 can follow the pointer in column 74 to an index 64 in part-of-speech combination table 62. The index 64 allows module 49 to access a field 66 containing one or more part-of-speech tags. The index 64 allows module 49 to access a field 66 containing one or more part-of-speech tags. The part-of-speech identification module 49 can then retrieve these part-of-speech tags or store the index to the part-of-speech tags with the extracted token. Generally, the suffix-matching method is applied if no representative entry in the word data table 31 was found for the extracted token.

A second alternative method for identifying the part-of-speech tags for the token involves default tagging. Generally, default tagging is only applied when the token was not identified in the word data table 31 and was not identified in suffix table 70. Default tagging associates the part-of-speech tag of NN (noun) with the token. As a result, at the end of step 249 each token has a part-of-speech tag or part-of-speech index that in turn refers to either single or multiple part-of-speech tags. After step 249, logical control flows to action box 250.

At action box 250, the grammatical feature identification module 51 of the processor 9 determines the grammatical features for the tokens 21 contained in the token list 17. The grammatical features for each token can be obtained by identifying a representative entry for the token in the word data table 31 of FIG. 3. The identified representative entry contains information pertaining to the grammatical features of the word in fields 32, 34, 36, 38, 40,42, 46,48, 50, 52, 54, 56, 58 and 60. These field in the representative entry either contain digital data concerning the grammatical features of the token, or point to an address in a memory element containing the grammatical features of the token. After box 250, control proceeds to decision box 251.

Decision box 251 queries whether the user requested disambiguation of the part-of-speech tags. If disambiguation was requested, control proceeds to action box 252. If disambiguation was not requested, control proceeds to action box 253. At action box 252, the part-of-speech tags of ambiguous tokens are disambiguated.

The disambiguator module 59 of the processor 47 identifies tokens having multiple part-of-speech tags as ambiguous and disambiguates the identified ambiguous tokens. Accordingly, action box 252 disambiguates those tokens identified as having multiple part-of-speech tags. For example, a first token extracted from the stream of text can be identified in the word data table 31 and thereby have associated with the first token an index 64 to the part-of-speech combination table 62. Furthermore, this index 64 can identify an entry having multiple part-of-speech tags in column 66 of table 62. Thus, the first token can be associated with multiple part-of-speech tags and be identified as ambiguous by processor 47.

Preferably, the first listed part-of-speech tag in table 62, called a primary part-of-speech tag, is the part-of-speech tag having the highest probability of occurrence based on frequency of use across different written genres and topics. The other part-of-speech tags that follow the primary part-of-speech tag in column 66 of table 62 are called the secondary part-of-speech tags. The secondary part-of-speech tags are so named because they have a lower probability of occurrence than the primary part-of-speech tag. The disambiguator can choose to rely on the primary part-of-speech tag as the part-of-speech tag to be associated with the ambiguous token. However, to ensure accurate identification of the part of speech for each token, this probabilistic method is not always reliable. Accordingly, in a preferred aspect, the invention provides for a disambiguator module 59 that can disambiguate those tokens having multiple part-of-speech tags through contextual analysis of the ambiguous token.

In particular, disambiguator 59 identifies a window of sequential tokens containing the ambiguous token and then determines the correct part-of-speech tag as a function of the window of sequential tokens. In a first embodiment, the window of sequential tokens can include, but is not limited to, the two tokens immediately preceding the ambiguous token and the token immediately following the ambiguous token. In a second embodiment, the window of sequential tokens includes the ambiguous token, but excludes those classes of tokens not considered particularly relevant in disambiguating the ambiguous token. One class of tokens considered less relevant in disambiguating ambiguous tokens include those tokens having part-of-speech tags of either: adverb; qualifying adverb; or negative adverbs, such as "never" and "not". This class of tokens is collectively referred to as tokens having "ignore tags". Under the second embodiment, for example, the disambiguator module 59 forms a window of sequential tokens containing "will run" after skipping those words having ignore tags in the following phrases: "will run"; "will frequently run"; "will very frequently run": "will not run"; and "will never run". The second embodiment thus ensures, by skipping or ignoring a class of irrelevant tokens, an accurate and rapid contextual analysis of the ambiguous token without having to expand the number of tokens in the window of sequential tokens. Moreover, a window of four sequential tokens ranging from the two tokens immediately preceding the ambiguous token and the token immediately following the ambiguous token can be expanded to include additional tokens by: (1) skipping those tokens contained within the original window of four sequential tokens that have ignore tags, and (2) replacing the skipped tokens with additional sequential tokens surrounding the ambiguous token.

The functions or rules applied by module 59 identify the most accurate part of speech of the ambiguous token based both upon the window of sequential tokens containing the ambiguous token and the characteristics associated with those tokens contained within the window of tokens. The characteristics associated with the tokens includes, either separately or in combination, the part-of-speech tags of the tokens and the grammatical features of the tokens.

Once the disambiguator module 59 of the processor 47 has identified the most accurate part-of-speech tag, the processor places this part-of-speech tag in the position of the primary part-of-speech tag, i.e., first in the list of the plurality of part-of-speech tags associated with the ambiguous token. Thus, the ambiguous target token remains associated with a plurality of part-of-speech tags after the operations of processor 47, but the first part-of-speech tag in the list of multiple part-of-speech tags has been verified as the most contextually accurate part-of-speech tag for the ambiguous token.

In one aspect, disambiguator 59 can determine that no disambiguation rules apply to the ambiguous token and can thus choose to not change the ordering of the plurality of part-of-speech tags associated with the ambiguous token. For example, a token having multiple part-of-speech tags has at least one part-of-speech tag identified as the primary part-of-speech tag. The primary part-of-speech tag can be identified because it is the first part-of-speech tag in the list of possible part-of-speech tags, as illustrated in FIG. 4A. If the disambiguator 59 determines that no disambiguation rules apply, the primary part-of-speech tag remains the first part-of-speech tag in the list.

In a further aspect, a disambiguation rule can be triggered and one of the secondary part-of-speech tags can be promoted to the primary part-of-speech tag. In accordance with another aspect, a disambiguation rule is triggered and the primary part-of-speech tag of the ambiguous token is coerced into a new part-of-speech tag, not necessarily found amongst the secondary part-of-speech tags. An additional aspect of the invention provides for a method wherein a disambiguation rule is triggered but other conditions required to satisfy the rule fail, and the primary part-of-speech tag is not modified. Thus, after disambiguating, each token has a highly reliable part-of-speech tag identified as the primary part-of-speech tag.

FIG. 9 illustrates an exemplary rule table used for disambiguating an extracted token in the English language. As discussed with respect to the tables illustrated in FIG. 3–FIG. 5, the disambiguation tables can differ from language to language. Advantageously, the tables can be added to the system 10 or removed from the system 10 to accommodate various languages without modifying the source code or hardware utilized in constructing the multilingual text processor 10 in accordance with the invention.

The illustrated table contains: (1) a column of rules numbered 1–6 and identified with label 261; (2) a column representing the ambiguous token [i] and identified with label 264; (3) a column representing the token [i+1] immediately following the ambiguous token and identified with label 266; (4) a column representing the token [i−1] immediately preceding the ambiguous token and identified with the label 262; and (5) a column representing the token [i−2] immediately preceding the token [i−1] and identified with the label 260. Accordingly, the table illustrated in FIG. 9 represents a group of six disambiguation rules that are applied by disambiguator 59, as part of the operations of the processor 47, to a window of sequential tokens containing the ambiguous token [i]. In particular, each rule contains a set of requirements in columns 260, 262, 264, and 266, which if satisfied, cause the primary part of speech of the ambiguous token to be altered. In operation, processor 47 sequentially applies each rule to an ambiguous token in the stream of text and alters the primary part-of-speech tag in accordance with any applicable rule contained within the table.

For example, rule 1 has a requirement and result labeled as item 268 in FIG. 9. In accordion with rule 1, the processor 47 coerces the primary part-of-speech tag of the ambiguous token to NN (singular common noun) if the ambiguous token [i] is at the beginning of a sentence and has a Capeode greater than 000 and does not have a part-of-speech tag of noun.

Rules 2–6, in FIG. 9, illustrate the promotion of a secondary part-of-speech tag to the primary part-of-speech tag as a function of a window of token surrounding the ambiguous token [i]. In particular, rule 2 promotes the secondary part-of-speech tag of singular common noun to the primary part-of-speech tag if: the token [i−2] has a primary part-of-speech tag of article, as shown by entry 270; the token [i] has a primary part-of-speech tag of either verb or second possessive pronoun or exclamation or verb past tense form, as shown by entry 272; and the token [i] has a secondary part-of-speech tag of singular common noun, as shown by entry 272. Rule 3 promotes the secondary part-of-speech tag of singular common noun to the primary part-of-speech tag if: the token [i–1] has a part-of-speech tag of verb infinitive or singular common noun, as shown by entry 274; and the token [i] has a primary part-of-speech tag of verb or second possessive pronoun or exclamation or verb past tense form and has a secondary part-of-speech tag of singular common noun, as shown by entry 276. Rule 4 promotes the secondary part-of-speech tag of singular common noun to the primary part-of-speech tag if: the token [i–1] has a part-of-speech tag of modal auxiliary or singular common noun, as shown by entry 278; the token [i] has a primary part-of-speech tag of modal auxiliary and has a second part-of-speech tag of singular common noun, as shown by entry 280; and the token [i+1] has a part-of-speech tag of infinitive, as shown by entry 282.

FIG. 9 thus illustrates one embodiment of the invention wherein the disambiguator 59 of the processor 47 modifies the ambiguous target token accordance with a rule table. In particular, the illustrated rule table instructs processor 47 to modify the part-of-speech tags of the ambiguous token as a function of: the two tokens preceding the ambiguous target token in the stream of text, the token following the ambiguous target token in the stream of text, and the ambiguous target token, itself. FIG. 9 further illustrates an embodiment wherein the ambiguous target token is modified as a function of the primary part-of-speech tag and the secondary part-of-speech tags of the ambiguous target token, and the part-of-speech tags of the other token surrounding the target token.

Agreement analysis prior to step 253, wherein the noun phrase is identified, operates in a single match mode that returns a success immediately after the first successful match. Thus, if agreement is being tested for token [i] and token [i–1] in the single match mode, processing stops as soon as a match is found. In accordance with this process, the processor selects the first part-of-speech tag from token [i], and tries to match it with each tag for the token [i–1] until success is reached or all of the part-of-speech tags in token [i–1] are exhausted. If no match is found, then the processor 47 tries to match the next part-of-speech tag in the token [i] with each tag in token [i–1] until success is reached or all of the part-of-speech tags in token [i–1] are exhausted. This process continues until either a match is reached, or all of the part-of-speech speech tags in both token [i] and token [i–1], have been checked with each other. A successful agreement found between two tokens indicates that the two tokens are to be treated as part of a noun phrase. If no agreement is found, then the two tokens are not considered to be a part of the same noun phrase.

First, the first POS tag from each token in checked for agreement.

|     | Agreement Tags    | Agreement Tags     | Agreement Tags    |
| --- | ----------------- | ------------------ | ----------------- |
| i-1 | Plural, Masculine | Singular, Masculine |                  |
| i   | Singular, Feminine | Singular, Masculine | Plural, Masculine |

(Tag1 & Tag2 & NumberMap) & (Tag1 & Tag2 & GenderMap)

fails      fails

Disambiguation step 252 can also provide for a system that aids in identifying the elements of a noun phrase by checking whether or not the tokens in the stream of natural language text agree in gender, number, and case. In particular, processor 47 can validate agreement between a candidate token and a token immediately adjacent (i.e., either immediately preceding or immediately following) the candidate token in the stream of text.

If this fails, the second POS tag from the token [i–1] is checked for a match:

|     | Agreement Tags    | Agreement Tags     | Agreement Tags    |
| --- | ----------------- | ------------------ | ----------------- |
| i-1 | Plural, Masculine | Singular, Masculine |                  |
| i   | Singular, Feminine | Singular, Masculine | Plural, Masculine |

(Tag1 & Tag2 & NumberMap) & (Tag1 & Tag2 & GenderMap)

passes      fails

At this point, all of the POS maps in the token [i–1] have been exhausted, and no successful match has been bound. The second POS tag in the token [i] must now be compared with all of the POS tags in the token [i–1].
The first POS tag from the token [i–1] and the second tag from the token [i] are checked for a match:

|     | Agreement Tags | Agreement Tags | Agreement Tags |
| --- | --- | --- | --- |
| i-1 | Plural, Masculine | Singular, Masculine |  |
| i | Singular, Feminine | Singular, Masculine | Plural, Masculine |

(Tag; & Tag2 & NumberMap) & (Tag1 & Tag2 & GenderMap)

fails           passes

If it fails, the second POS tag from the token [i-1] is checked for agreement:

|     | Agreement Tags | Agreement Tags | Agreement Tags |
| --- | --- | --- | --- |
| i-1 | Plural, Masculine | Singular, Masculine |  |
| i | Singular, Feminine | Singular, Masculine | Plural, Masculine |

(Tag1 & Tag2 & NumberMap) & (Tag1 & Tag2 & GenderMap)

passes          passes

At this point, a match has successfully been made, and all agreement processing stops. The two tokens agree and Single Match mode processing is complete.

After Step 252, logical flow proceeds to Step 253. At step 253, the noun-phrase identifier module 53 of processor 47 identifies the boundaries of noun phrases contained within the stream of natural language text, and marks those tokens forming the noun phrase. In particular, processor 47 identifies the noun-phrase boundaries through contextual analysis of each extracted token in the stream of text. In addition, module 53 marks those tokens forming the noun phrase by tagging tokens contained within the noun phrase. For example, module 53 can associate with: the first token in the noun phrase a tag indicating "the beginning" of the noun phrase; the last token in the noun phrase a tag indicating "the end" of the noun phrase; and those tokens found between the first and last tokens in the noun phrase a tag indicating "the middle" of the noun phrase. Thus, module 53 of processor 47 identifies those tokens that it determines are members of a noun phrase as either "the beginning", "the middle", or "the end" of the noun phrase.

According to one aspect of the invention, the noun-phrase identifier module 53 processor 47 forms a window of sequential tokens to aid in identifying members of a noun phrase. Further in accordance with this aspect, the window of sequential tokens includes a token currently undergoing analysis, called a candidate token, and tokens preceding and following the candidate token in the stream of text. Preferably, the window of tokens includes the candidate token and one token immediately following the candidate token in the stream of text and one token immediately preceding the candidate token in the stream of text. Thus, the window contains at least three extracted token ranging from the token preceding the candidate token to the token following the candidate token inclusive. This window of sequential tokens provides a basis for contextually analyzing the candidate token to determine whether or not it is a member of a noun phrase.

The module 53 analyses characteristics of the window of sequential tokens to determine whether the candidate token is a member of a noun phrase. The characteristics analyzed by processor 47 include, either separately or in conjunction, the part-of-speech tags and the grammatical features of each of the tokens contained within the window of tokens. Module 53 of processor 47 contextually analyzes the candidate token by applying a set of rules or functions to the window of sequential tokens surrounding the candidate token, and the respective characteristics of the window of sequential tokens. By applying these rules, module 53 identifies those candidate tokens which are members of noun phrases contained within the stream of text.

The noun-phrase identification rules are a set of hard-coded rules that define the conditions required to start, continue, and terminate a noun phrase. In general, noun phrases are formed by concatenating together two or more contiguous tokens having parts of speech functionally related to nouns. Those parts of speech functionally related to nouns include the following parts of speech: singular common noun (NN), adjective (JJ), ordinal number (ON), cardinal number (CD). In one embodiment, the noun-phrase rules apply these concepts and form noun phrases from those sequential tokens having parts of speech functionally related to nouns.

Thus, for example, a set of four rules in pseudocode for identifying noun phrase is set forth in Table I below.

TABLE I

| | |
| --- | --- |
| 1 | If the token is a member of NounPhrase Tags |
| 2 |    start to form a Noun Phrase. |
| 3 | If the token is a stop list noun or adjective |
| 4 |    If the Noun-phrase length is 0 |
| 5 |       don't start the Noun Phrase |
| 6 |    else |
| 7 |       break the Noun Phrase. |
| 8 | If the token is a lowercase noun AND |
| 9 |    the following token is an uppercase noun |
| 10 |    break the Noun Phrase. |
| 11 | If the token is a member of Noun-phrase Tags |
| 12 |    continue the Noun Phrase. |

In Table I, lines 1-2 represent a first rule and provide for identifying as a "beginning of a noun phrase" those candidate tokens having a part-of-speech tag functionally related to noun word forms. That is, tie first rule tags as tie beginning of a noun phrase tiose tokens having a part-of-speech tag selected from the group of part-of-speech tags, including: singular common noun, adjective, ordinal number, cardinal number.

Lines 3-7, in Table I, represent a second rule. The second rule provides for identifying as an "end of tie noun phrase" those candidate tokens having a part-of-speech tag selected from tie group consisting of stoplist nouns and adjectives. The default implementation of the second rule contains the two stoplist nouns (i.e., one and ones) and one stoplist adjective (i.e., such). In particular applications, however, the user may introduce user-defined stoplist nouns and adjectives. For example, a user may chose to treat semantically vague generic nouns such as use and type as stoplist nouns.

In addition, lines 8–10 represent a third rule. This third rules specifies that module 53 of processor 47 is to identify as an "end of the noun phrase" those selected tokens having a part-of-speech tag of noun and having a Capcode field identification of "000" (i.e., lowercase), when the selected token is followed by an extracted token having a part-of-speech tag of noun and having a Capcode field identification of "001" (initial uppercase) or "010" (i.e., all uppercase). Thus, in general, the third rule demonstrates identifying the end of a noun phrase through analysis of a group of tokens surrounding a candidate token, and the third rule demonstrates identifying the end of a noun phrase through analysis of the part-of-speech tags and grammatical features of tokens in the window of sequential tokens.

The fourth rule, represented by lines 11–12 in Table I, provides for identifying as a "middle of the noun phrase" those selected tokens having a part-of-speech tag functionally related to noun word forms and following an extracted token identified as part of the noun phrase. For example, a token having a part-of-speech tag functionally related to noun word forms and following a token that has been identified as the beginning of the noun phrase is identified as a token contained within the middle of the noun phrase.

In operation, module 53 in conjunction with processor 47 applies each role in Table I to each token extracted from the stream of natural language text. These rules allows module 53 to identify those tokens which are members of a noun phrase, and the relative position of each token in the noun phrase. The rules illustrated in Table I are not language-specific. However, other tables exist which contain language-specific rules for identifying noun phrases. Table II–VI, as set forth below, contain language-specific rules.

TABLE II

English Language Noun-Phrase Rules

1  If the token is uppercase AND
2  the token has a Part-of-speech Tag of Singular Adverbial Noun AND
3  the preceding token is a noun
4     break the Noun Phrase
5  If the token is an adjective AND
6  the preceding token is a non-possessive noun
7     break the Noun Phrase
8  If the token is "of" or "&" AND
9  the preceding token is an uppercase noun AND
10 the following token is an uppercase noun
11    form a Noun Phrase starting with the preceding token and
12    continue the Noun Phrase as long as NounPhrase Tags are
13    encountered.

Table II contains a group of rules, in psuedocode, specific to the English language. For example, lines 1–4 specify a first rule for identifying the end of a noun phrase, lines 5–7 recite a second rule for identifying the end of a noun phrase, and lines 8–13 specify a third rule for identifying the beginning and for identifying the middle of a noun phrase.

TABLE III

German Language Noun-Phrase Rules

1  If the token is an adjective AND
2  the preceding token is a noun AND
3  the following token is a member of NounPhrase Tags
4     break the Noun Phrase Table III contains a group of rules, in psuedocode, specific to the German Language. For example, lines 1–4 specify a rule for identifying the end of a noun phrase.

TABLE IV

Italian Language Noun-Phrase Rules

1  If the token is "di" AND
2  the preceding token is a noun AND
3  the following token is a lowercase noun
4     form a Noun Phrase starting with the preceding token and
5     continue the Noun Phrase as long as NounPhrase Tags are
6     encountered.

Table IV contains a group of rules, in psuedocode, specific to the Italian Language. For example, lines 1–6 specify a rule for identifying the end of a noun phrase.

TABLE V

French and Spanish Noun Phrase Rules

1  If the token is "de" AND
2  the preceding token is a noun AND
3  the following token is a lowercase noun
4     form a Noun Phrase starting with the preceding token and continue
5     Noun Phrase as long as NounPhrase Tags are encountered.

Table V contains a group of rules, in psuedocode, specific to the French and Spanish Languages. For example, lines 1–5 recite a role for identifying the beginning and the middle of a noun phrase.

TABLE VI

French and Spanish and Italian Noun-Phrase Rules

1  If the token is an adjective AND
2  the preceding token is a noun AND
3  the following token is a noun
4  break the Noun Phrase Table VI contains a group of rules, in psuedocode, specific to the French and Spanish and Italian languages. For example, lines 1–4 recite a rule for identifying the end of a noun phrase.

After action box 253 of FIG. 8, control proceeds to decision box 254 of FIG. 8. At decision box 254 the processor 47 identifies whether the user requested application of the agreement rules to the noun phrase identified in action box 253. If the user did not request application of the agreement rules, control branches to decision box 256. If the user did request application of the agreement rules, logical control proceeds to action box 255 wherein the agreement rules are applied.

At action box 255 the agreement checking module 57 of the processor 47 ensures that the tokens within the identified noun phrase are in agreement. Although English has no agreement rules, other languages such as German, French and Spanish require agreement between the words contained within a noun phrase. For example, French and Spanish require gender and number agreement within the noun phrase, while German requires gender, number, and case agreement within the noun phrase. The grammatical features concerning gender, number, and case agreement are supplied by the grammatical feature fields of the word data table.

FIG. 10 illustrates a pseudocode listing that processor 47 executes to ensure agreement between the various members contained within identified noun phrase. In particular, processor 47 iteratively checks whether a first identified part of a noun phrase agrees with a second identified part of the noun phrase that immediately follows the first identified part in the stream of text. As described below, processor 47 ensures that each particular extracted token within the noun phrase agrees with all other extracted tokens contained in the noun phrase.

Pictorially, given a series of tokens with their associated agreement tags as shown below, where all tokens shown are valid candidates for being in the noun phrase, it would be possible to form a noun phrase that started with the token [i−2] and continued to the token [i+1] because they all agree with respect to the agreement tags of "Singular, Feminine".

|     | Agreement Tags    | Agreement Tags    | Agreement Tags    |
| --- | ----------------- | ----------------- | ----------------- |
| i−2 | Plural, Masculine | Singular, Masculine | Singular, Feminine |
| i−1 | Plural, Masculine | Singular, Feminine | Plural, Feminine |
| i   | Singular, Feminine | Singular, Masculine | Plural, Masculine |
| i+1 | Singular, Feminine |                   |                   |

In one embodiment for checking agreement, two temporary array areas, temp1 and temp2, are proposed for storing the tokens while agreement is iteratively checked between the identified parts of the noun phrase.

The token [i−2], identified as the "beginning of the noun phrase" has all of its agreement tags copied to a temporary area, temp1.

| temp1 | Plural, Masculine | Singular, Masculine | Singular, Feminine |
| ----- | ----------------- | ------------------- | ------------------ |
| temp2 |                   |                     |                    |

All agreement tags for the next token, token [i−1], whose values agree with temp1 area are placed in a second temporary area, temp2.

| temp1 | Plural, Masculine | Singular, Masculine | Singular, Feminine |
| ----- | ----------------- | ------------------- | ------------------ |
| temp2 | Plural, Masculine | Singular, Feminine  |                    |

As long as there some identified agreement tags in temp1 and temp2, agreement has passed and the noun phrase can continue to be checked. If there is no match, agreement fails and the noun phrase is broken. When the noun phrase is broken, the last token that agrees with the previous tokens in the noun phrase is reidentified as the "end of the noun phrase".

In the current case being examined, there was agreement between temp1 and temp2, so that the contents of temp2 are copies to temp1, and the next token is retrieved.

| temp1 | Plural, Masculine | Singular, Feminine |
| ----- | ----------------- | ------------------ |
| temp2 |                   |                    |

All agreement tags for the next token [i] whose values agree with temp1 are placed in the second temporary area, temp2. When this is done, the temporary areas contain:

| temp1 | Plural, Masculine | Singular, Feminine |
| ----- | ----------------- | ------------------ |
| temp2 | Singular, Feminine | Plural, Masculine | because token [i−2], token [i−1], and token [i] all have the above listed agreement tags in common, the contents of temp2 area are copied to temp1, and the next token is retrieved.

| temp1 | Singular, Feminine | Plural, Masculine |
| ----- | ------------------ | ----------------- |
| temp2 |                    |                   |

All agreement tags for the next token [i+1] whose values agree with temp1 are placed in a second temporary area, temp2. When this is done, the second temporary areas contain:

| temp1 | Singular, Feminine | Plural, Masculine |
| ----- | ------------------ | ----------------- |
| temp2 | Singular, Feminine |                   | because the token [i−2], token [i−1], token [i], and token [i+1] all have these agreement tags in common, the contents of temp2 area are copied to temp1, and the next token is retrieved.

| temp1 | Singular, Feminine |
| ----- | ------------------ |
| temp2 |                    |

At this point, noun phrase processing ends in our example. All the tokens from token [i−2] to token [i+1] had at least one agreement tag in common, and thus passed the agreement test.

In a further embodiment, the agreement checker 57 of the processor 47 creates a "supertag" when checking agreement in accordance with action box 255 of FIG. 8. The supertags allow the agreement module 57 to quickly identify whether the extracted tokens fail to agree, or whether they may agree. In particular, a supertag is created for each extracted word contained within the identified noun phrase by logically OR'ing together all the agreement tags associated with each identified token in the noun phrase.

A supertag associated with one token in the noun phrase is then compared against the supertag associated with the following token in the noun phrase to see if any form of agreement is possible. A form of agreement is possible if the required number, gender, and case parameters agree or contain potential agreements between each of the supertags. If the required number, gender, and case parameters contained in the supertags do not agree, then agreement is not possible. By making this comparison, it can be quickly determined whether or not agreement may exist between the tokens or whether agreement is impossible.

After action box 255, logical flow proceeds to decision box 256. At decision box 256 the processor 47 identifies whether the user requested application of the truncation rules to the noun phrase identified in action box 253. If the user did not request application of the truncation rules, control branches to action box 258. If the user did request application of the trimcation rules, logical control proceeds to action box 257 wherein the truncation rules are applied.

At action box 257, the truncator module 61 of the processor 47 truncates the identified noun phrases. In one aspect of the invention, as illustrated by the pseudocode listing of FIG. 11, meator 61 truncates noun phrases exceeding two words in length which satisfy a specific set of rules. In accordance with another aspect of the invention, the truncator 61 removes tokens within the noun phrase that fail to agree with the other tokens within the noun phrase. Preferably, this operation is achieved by the truncator module 61 operating in conjunction with the agreement checking module 57. For example, agreement module 57 identifies those tokens within the noun phrase that are in agreement and those tokens that are not in agreement, and truncator module 61 re-examines which tokens belong in the noun phrase based upon the agreement analysis of agreement checking module 57. Thus truncator module 61 meates from the noun phrase the set of tokens following, and including, a token that does not agree with the preceding members of the identified noun phrase.

At action box 258, processor 47 outputs the tokens extracted from the input stream of natural language text into the output buffer 19 of the application program interface 11. Processor 47 also generates the token list 17 that correlates the input buffer of text 15 with the output buffer 19, and places the token list 17 into the application program interface. The generated token list 17 comprises an array of tokens that describe parameters of the input and output data. The parameters associated with each token include the part-of-speech tags, the grammatical features, and the noun-phrase member tags. With this data, processor 30 in digital computer 12 is able to output to display 20 the identified noun phrases contained within the input stream of nasal language text.

FIG. 12 illustrates an example of the operation of the noun-phrase analyzer 13 having an input buffer 400, a token list 402, an output buffer 404, and identified noun phrases 406. In particular, input buffer 400 contains a natural language text stream reading "The cash flow is strong, the dividend yield is high, and". Token list 402 contains a list of tokens, wherein the tokens "cash" and "dividend" are identified as the "beginning of a noun phrase", and wherein the tokens "flow" and "yield" are identified as the "end of a noun phrase". Output buffer 404 contains a list of the lexical expressions found in the input buffer 400, and box 406 contains the identified noun phrases "cash flow" and "dividend yield".

FIG. 12 demonstrates the ability of the noun-phrase analyzer 10 to identify groups of words having a specific meaning when combined. Simply tokenizing the word in the stream of text and placing them in an index could result in many irrelevant retrievals.

While the invention has been shown and described having reference to specific preferred embodiments, those skilled in the art will understand that variations in form and detail may be made without departing from the spirit and scope of the invention.

Having described the invention, what is claimed as new and secured by Letters Patent is:

1. A data processing method for identifying noun phrases in a stream of words, the method comprising the steps of:
   extracting a sequence of tokens from the stream,
   storing the sequence of tokens in a first memory element,
   determining the most probable part-of-speech tag and grammatical features for each token, and
   identifying parts of a noun phrase by inspecting the part-of-speech tags and the grammatical features of a window of extracted tokens, the window of extracted tokens, including a selected candidate token and a first token preceding the selected candidate token and a second token following the selected candidate token.

2. A method in accordance with claim 1 wherein the identifying step further comprises:
   identifying as a beginning of the noun phrase a candidate token having a part-of-speech tag functionally related to noun word forms,
   identifying as a middle of the noun phrase a candidate token when the candidate token has a part-of-speech tag functionally related to noun word forms and when the first token is an identified part of the noun phrase, and
   identifying as an end of the noun phrase a candidate token when the candidate token has a part-of-speech tag of noun and has a grammatical feature of lowercase and when the second token has a part-of-speech tag of noun and has a grammatical feature of uppercase.

3. A method in accordance with claim 2, wherein the identifying step further comprises identifying as an end of the noun phrase a candidate token having a part-of-speech tag selected from the group consisting of stop list nouns and adjectives.

4. A method in accordance with claim 2, wherein those tokens having a part-of-speech tag functionally related to noun word forms are selected from the group of part-of-speech tags consisting of: nouns, adjectives, ordinal numbers, cardinal numbers.

5. A method in accordance with claim 1, further comprising the step of initializing a language database prior to the extracting step, the language database being selected from the group consisting of: English, German, Spanish, Portuguese, French, Dutch, Italian, Swedish, and Japanese.

6. A method in accordance with claim 5 having a selected language database of English, further comprising the step of identifying as an end of a noun phrase a candidate token when the candidate token has a part-of-speech tag of singular adverbial noun and has a grammatical feature of uppercase and when the first token has a part-of-speech tag of noun.

7. A method in accordance with claim 5 having a selected language database of English, further comprising the step of identifying as an end of a noun phrase a candidate token when the candidate token has a part-of-speech tag of adjective and when the first token has a part-of-speech tag of non-possessive noun.

8. A method in accordance with claim 5 having a selected language database of German, further comprising the step of identifying as an end of a noun phrase a selected token when the selected token has a part-of-speech tag of adjective and when the first token has a part-of-speech tag of noun and when the second token has a part-of-speech tag functionally related to noun word forms.

9. A method in accordance with claim 8, wherein the token has a part-of-speech tag selected from the group consisting of: nouns, adjectives, ordinal numbers, cardinal numbers.

10. A method in accordance with claim 5 having a language database selected from the group consisting of French, Spanish, and Italian, the method further comprising the step of identifying the as an end of a noun phrase a candidate token when the candidate token has a part-of-speech tag of adjective and when the first token has a part-of-speech tag of noun and when the second token has a part-of-speech tag of noun.

11. A data processing method for identifying noun phrases in a stream of words, the method comprising the steps of:
    extracting a sequence of tokens from the stream,
    storing the sequence of tokens in a first memory element,
    determining the most probable part-of-speech tag and grammatical features for each token,
    identifying parts of a noun phrase by inspecting the part-of-speech tags of successive tokens, and
    iteratively checking agreement between a first identified part of the noun phrase and a second identified part of the noun phrase immediately following the first identified part in the stream of text.

12. A method in accordance with claim 11 wherein the iterative checking step further comprises:

monitoring gender agreement between the first identified part of the noun phrase and the second identified part of the noun phrase, and monitoring number agreement between the first identified part of the noun phrase and the second identified part of the noun phrase.

13. A method in accordance with claim 12 wherein the successive checking step further comprises monitoring case agreement between the first identified part of the noun phrase and the second identified part of the noun phrase.

14. A data processing method for identifying noun phrases in a stream of words, the method comprising the steps of:

extracting a sequence of tokens from the stream, storing the sequence of tokens in a first memory element, determining at least one part-of-speech tag for each token, disambiguating the at least one part-of-speech tag of an ambiguous token by inspecting the part-of-speech tags of a window of sequential tokens containing the ambiguous token, and identifying parts of a noun phrase by inspecting the part-of-speech tags of successive tokens.

15. A method in accordance with claim 14, wherein the determining step further comprises locating at least one lexical expression representative of an extracted token in a first addressable table, the first addressable table containing a list of lexical expressions with each lexical expression being associated with at least one part-of-speech tag.

16. A method in accordance with claim 15, wherein the determining step further comprises:

forming a target suffix from the last three characters of the extracted token, and locating a stored suffix matching the target suffix in a second addressable table, the second addressable table containing a list of stored suffixes with each stored suffix being associated with at least one part-of-speech tag.

17. A method in accordance with claim 16, wherein the determining step further comprises associating a part-of-speech tag of noun with an extracted token not located in the first addressable table and not located in the second addressable table.

18. A method in accordance with claim 14, further comprising the step of forming a window of sequential tokens, including the ambiguous token and a token immediately following the ambiguous token in the stream of words and at least two tokens immediately preceding the ambiguous tokens in the stream of words.

19. A method in accordance with claim 14, wherein the disambiguating step further comprises:

identifying a primary part-of-speech tag of the ambiguous token, identifying a secondary part-of-speech tag of the ambiguous token, and promoting the secondary part-of-speech tag to the primary part-of-speech tag as a function of the part-of-speech tags of the window of sequential tokens.

20. A method in accordance with claim 19, wherein the promoting step further comprises promoting the secondary part-of-speech tag to the primary part-of-speech tag as a function of the identified primary part-of-speech tag of the ambiguous token and as a function of the identified secondary part-of-speech tag of the ambiguous token.

21. A method in accordance with claim 14, wherein the disambiguating step further comprises generating a primary part-of-speech tag by operating upon the part-of-speech tags of the window of sequential tokens with a predetermined rule, and replacing the at least one part-of-speech tag of the ambiguous tokens with the generated primary part-of-speech tag, such that the primary part-of-speech tag is contextually accurate.

22. A method in accordance with claim 14, further comprising the step of truncating the identified noun phrase.

23. An apparatus for identifying noun phrases contained in a stream of words, the apparatus comprising:

tokenizing means for extracting a sequence of digital signals representative of a sequence of tokens contained in the stream, first addressable memory means containing a list of lexical expressions with each lexical expression being associated with a part-of-speech tag and grammatical features, data processing means coupled with the tokenizing means and with the first addressable memory means, the data processing means, including:

means for determining a part-of-speech tag and grammatical features for each token by identifying in the first addressable memory means at least one lexical expression representative of each token, and means for identifying parts of a noun phrase by inspecting the part-of-speech tags of a first window of tokens, and means for generating an output signal representative of the tokens forming the identified noun phrase.

24. An apparatus according to claim 23, wherein the means for identifying parts of a noun phrase further comprises:

means for identifying as a beginning of the noun phrase a token having a part-of-speech tag functionally related to noun word forms, means for identifying as a middle of the noun phrase a token having a part-of-speech tag functionally related to noun word forms, and having immediately followed a token identified as part of the noun phrase, and means for identifying as an end of the noun phrase a token having a part-of-speech tag of noun and having a grammatical feature of lowercase, and having immediately preceded an extracted tokens having a part-of-speech tag of noun and having a grammatical feature of uppercase.

25. An apparatus according to claim 23, wherein the data processing means further comprises means for iteratively checking agreement between a first identified part of the noun phrase and a second identified part of the noun phrase immediately following the first identified part in the stream of text.

26. An apparatus according to claim 25, wherein the means for iteratively checking agreement further comprises:

means for monitoring gender agreement between the first identified part of the noun phrase and the second identified part of the noun phrase, and means for monitoring number agreement between the first identified part of the noun phrase and the second identified part of the noun phrase.

27. An apparatus according to claim 26, wherein the means for iteratively checking agreement further comprises means for monitoring case agreement between the first identified part of the noun phrase and the second identified part of the noun phrase.

28. An apparatus according to claim 23 further comprising a second addressable memory means coupled with the data processing means, the second addressable memory means containing a list of stored suffixes with each stored suffix being associated with at least one part-of-speech tag, and wherein the data processing means further comprises a means for determining a part-of-speech tag for each token by identifying in the second addressable memory means at least one stored suffix representative of the last three characters of each token.

29. An apparatus according to claim 28 wherein the data processing means further comprises means for assigning a part-of-speech tag of noun to each token.

30. An apparatus according to claim 23, wherein the data processing means further comprises a means for disambiguating the part-of-speech tag of an ambiguous token by inspecting the part-of-speech tags of a second window of sequential token containing the ambiguous token.

31. An apparatus according to claim 30, further comprising a means for forming the second window of words such that the second window of words includes the ambiguous token and a token immediately following the ambiguous token in the stream of words and at least two tokens immediately preceding the ambiguous token in the stream of words.

32. An apparatus according to claim 30, wherein the disambiguating means further comprises:

means for identifying a primary part-of-speech tag of the ambiguous token, means for identifying at least one secondary part-of-speech tag of the ambiguous token, and means for promoting the at least one secondary part-of-speech tag to the primary part-of-speech tag as a function of the part-of-speech tags of the second window of sequential token.

33. An apparatus according to claim 32, wherein the promoting means further comprises a means for promoting the at least one second part-of-speech tag to the primary part-of-speech tag as a function of the identified primary part-of-speech tag of the ambiguous token and as a function of the identified at least one secondary part-of-speech tag of the ambiguous token.

34. An apparatus according to claim 30, wherein the disambiguating means further comprises:

means for generating a primary part-of-speech tag by operating upon the part-of-speech tags of the second window of sequential tokens with a predetermined rule, and means for replacing the at least one part-of-speech tag of the ambiguous token with the generated primary part-of-speech tag, such that the primary part-of-speech tag is contextually accurate.

35. An apparatus according to claim 23, wherein the data processing means further comprises a means for rameating the identified noun phrase.

36. A method in accordance with claim 14, further comprising the step of forming a window of sequential tokens, including the ambiguous token and excluding sequential tokens having ignore tags.

37. A method in accordance with claim 36, wherein the ignore tags are selected from the group of part-of-speech tags consisting of: adverbs, qualifying adverbs, and negative adverbs.

38. An apparatus according to claim 30, further comprising a means for forming the second window of words such that the second window of words includes the ambiguous token and excludes sequential tokens having ignore tags.

39. An apparatus according to claim 38, wherein the ignore tags are selected from the group of part-of-speech tags consisting of: adverbs, qualifying adverbs, and negative adverbs.

* * * * *